(12) United States Patent
Weiss

(10) Patent No.: US 8,670,996 B1
(45) Date of Patent: Mar. 11, 2014

(54) HEALTH CARE INCENTIVE APPARATUS AND METHOD

(71) Applicant: David I. Weiss, Lincolnwood, IL (US)

(72) Inventor: David I. Weiss, Lincolnwood, IL (US)

(*) Notice: Subject to any disclaimer, the term of this patent is extended or adjusted under 35 U.S.C. 154(b) by 0 days.

(21) Appl. No.: 13/826,037

(22) Filed: Mar. 14, 2013

(51) Int. Cl.
*G06Q 10/00* (2012.01)
*G06Q 50/00* (2012.01)
*G06Q 30/00* (2012.01)

(52) U.S. Cl.
USPC .......................... 705/2; 705/14.1; 705/14.11

(58) Field of Classification Search
USPC ................................................ 705/2, 3, 4, 14
See application file for complete search history.

(56) References Cited

U.S. PATENT DOCUMENTS

| | | | | |
|---|---|---|---|---|
| 2003/0149594 | A1* | 8/2003 | Beazley et al. .................. | 705/2 |
| 2005/0065821 | A1* | 3/2005 | Kalies, Jr. ......................... | 705/2 |
| 2005/0102172 | A1* | 5/2005 | Sirmans, Jr. ...................... | 705/4 |
| 2005/0228692 | A1* | 10/2005 | Hodgdon ........................ | 705/2 |
| 2005/0288964 | A1* | 12/2005 | Lutzen et al. .................... | 705/2 |
| 2007/0162303 | A1* | 7/2007 | Wiley et al. ..................... | 705/2 |
| 2008/0288290 | A1* | 11/2008 | Steinberg et al. ................ | 705/3 |
| 2008/0300923 | A1* | 12/2008 | Theophilos ...................... | 705/4 |

OTHER PUBLICATIONS

Grande, David. "The cost of drug coupons." JAMA 307.22 (2012): 2375-2376.*

Nemlekar, Poorva. "A web-based survey to assess perceptions of managed care organization representatives regarding the use of co-pay subsidy coupons for prescription drugs." MS thesis The University of Texas at Austin, May 2012. Available at http://hdl.handle.net/2152/ETD-UT-2012-05-5101 Published web Aug. 2, 2012. Accessed Nov. 6, 2013.*

Pollack A. Coupons for Patients, but Higher Bills for Insurers. The New York Times. Jan. 1, 2011. Available at: http://www.nytimes.com/2011/01/02/business/02coupon.html?_r=1&ref=andrewpollack. Accessed Nov. 6, 2013.*

Payers Counteract Some Rx Coupon Programs, Partners on Others. Drug Benefit News. Nov. 13, 2009;10(22). http://www.silverlink.com/assets/pdfs/silverlinknews/dbn111309_b.pdf. Accessed Nov. 6, 2013.*

Quinn FJ. Coupons, Vouchers and 'Loyalty' Cards Connect Drugmakers with Patients. Pharmaceutical Commerce. Oct. 31, 2009. Available at: http://www.pharmaceuticalcommerce.com/frontEnd/1316-Coupons_Vouchers_and_%E2%80%98Loyalty%E2%80%99_Cards_Connect_Drugmakers_With_Patients.html. Accessed Nov. 6, 2013.*

Drug Makers Trying Coupons to Keep Customers. USA Today. May 31, 2001. Available at:http://www.usatoday.com/news/healthscience/health/2001-05-31-drug-coupons.htm. Accessed Nov. 6, 2013.*

Nasonex Coupon. Copyright date 2012. Downloaded from http://www.nasonex.com/nasx/jsp/special_offers/multi_use_savings_coupon/index.jsp Accessed Nov. 6, 2013.*

* cited by examiner

*Primary Examiner* — Neal Sereboff
*Assistant Examiner* — Jonathan Durant
(74) *Attorney, Agent, or Firm* — Greer, Burns & Crain, Ltd.

(57) ABSTRACT

An embodiment of the invention provides, among other things, a method for providing a cost modification of a health care item for a subject. In an example method, a request is received for a health care item from a point of purchase of the health care item. Cost adjustment data is received from at least one source. The cost adjustment data is used to determine a cost modification for the health care item. The cost modification is communicated to a point of purchase of the health care item.

21 Claims, 11 Drawing Sheets

116

This is not a bill
Questions: Call Customer Service at 1-800........

Pharmaceutical Explanation of Benefits *(provided at point of Service by Pharmacist who collects real time adjusted co-pay allowing collection of adjusted co-pay at time of service as well as reinforcing benefits of Dynamic Co-Pay adjustment. (Can be printed hard copy downloaded from server collating data inputs, or electronically distributed via mobile app or web)*

Medication Information:

118

| | Date of Service | Amount Billed | Not Covered | Covered |
|---|---|---|---|---|
| Doe Pharmacy<br>Lipitor 20 mg 30 tablets<br>1 tablet by mouth with evening meal | 05/04/12 | $200.00 | | $200.00 |

Coverage Information:

| | | |
|---|---|---|
| Totals | $200.00 | $200.00 — 120 |
| Manufacturer's Co-pay Coupon | -$100.00 | |
| Deductions | | — 122 |
| Fixed Co-payment Amount Branded drug | $30.00 | |
| Dynamic Co-Payment:(Fixed Co-Pay (30) + Coupon Amt.(100) | -$130.00 (1) | 126 |
| Patient Co-Payment Due after Coupon Applied | -$30.00 | |
| Actual Total Cost of Drug ($200 - $100 Manufacturer's Coupon) | | $100.00 |
| Co-Payment Due From Member ($130 Dynamic co-pay – Coupon) | $30.00 | |
| Co-Pay You Owe | $30.00 (lower cholesterol=lower co-pay)(2) | |
| Total due from Health Plan | | $70 — 127 |
| *(Total Cost of Rx Reduced by $100 utilizing maximal coupon amount; dynamic co-pay reduces total prescription cost while reinforcing optimal behaviors and achieving target cholesterol goal) | | |
| Total Covered Benefits Paid To Doe Pharmacy | | $90.00** |
| Total Amount owed by You | | $10.00 |
| **(Additional $100.00 paid by Manufacturer to Doe Pharmacy via Coupon; Total Rec. By Doe = $200) | | |

(1) Your Health Plan requires you to utilize all available manufacturers' discount coupons in order to achieve the lowest available Co-Pay. A list of available Coupons and where to obtain them is available at the Health Plan Website (Portal URL) — 124

(2) Want to Save More and Stay Healthy? Save on your next prescription refill co-payment; Go To (Portal URL) and take the cholesterol self test. Pass the test and get your next prescription for your cholesterol lowering medication filled with a $10 discount on your co-payment, reduce your cholesterol to ≤200 and reduce your co-pay by an additional $20; you can save up to $30.00 on future refills! — 128

*Comments in asterisks are for illustration purposes only and can be omitted from actual EOB Questions on your Co-payment call the Health Plan office or go to our Web Portal at (Portal URL) and see your benefits in greater detail and learn about other ways to stay healthy and lower your co-pay costs. You may be eligible for a reduction on your Co-Premium. See (Portal URL) for additional ways to stay healthy and save! — 130

FIG. 7

This is not a bill
Questions: Call Customer Service at 1-800........

132

Pharmaceutical Explanation of Benefits *(provided at point of Service by Pharmacist who collects real time adjusted co-pay allowing collection of adjusted co-pay at time of service as well as reinforcing benefits of Dynamic Co-Pay adjustment. (Can be printed hard copy downloaded from server collating data inputs, or electronically distributed via mobile app or web)*

Medication Information:

| | Date of Service | Amount Billed | Not Covered | Covered |
|---|---|---|---|---|
| Doe Pharmacy<br>Lipitor 20 mg 30 tablets<br>1 tablet by mouth with evening meal | 05/04/12 | $200.00 | | $200.00 |

118

Coverage Information:

| | | |
|---|---|---|
| Totals | $200.00 | $200.00 |
| Manufacturer's Co-pay Coupon | -$100.00 | |
| Deductions | | |
| Fixed Co-payment Amount Branded drug | $30.00 | |
| Dynamic Co-Payment:(Fixed Co-Pay (30) + Coupon Amt.(100) | -$130.00 (1) | |
| Patient Co-Payment Due after Coupon Applied | -$30.00 | |
| Actual Total Cost of Drug ($200 - $100 Manufacturer's Coupon) | | $100.00 |
| Co-Payment Due From Member ($130 Dynamic co-pay – Coupon) | $30 .00 | |
| Co-Pay Discount Total Cholesterol ≤ 200 *(Input From Elect. Med Rec) | $20.00 (2) | |
| Co-Pay You Owe | $10.00 (lower cholesterol=lower co-pay) | |
| Total due from Health Plan | | $90. |
| *(Total Cost of Rx Reduced by $100 utilizing maximal coupon amount; dynamic co-pay reduces total prescription cost while reinforcing optimal behaviors and achieving target cholesterol goal) | | |
| Total Covered Benefits Paid To Doe Pharmacy | | $90.00** |
| Total Amount owed by You | $10.00 | |
| **(Additional $100.00 paid by Manufacturer to Doe Pharmacy via Coupon; Total Rec. By Doe = $200) | | |

120, 122, 126, 132, 136, 138

(1) Your Health Plan requires you to utilize all available manufacturers' discount coupons in order to achieve the lowest available Co-Pay. A list of available Coupons and where to obtain them is available at the Health Plan Website (Portal URL). — 124
(2) Want to Save More and Stay Healthy; Save on more your next prescription refill co-payment; Go To (Portal URL) and take the cholesterol self test. Pass the test and get your next prescription for your cholesterol lowering medication filled with no co-payment; you save $30.00! — 128

*Comments in asterisks are for illustration purposes only and can be omitted from EOB Questions on your Co-payment call the Health Plan office or go to our Web Portal at (Portal URL) and see your benefits in greater detail and learn about other ways to stay healthy and lower your co-pay costs. You may be eligible for a reduction on your Co-Premium. See (Portal URL) for additional ways to stay healthy and save! — 130

This is not a bill
Questions: Call Customer Service at 1-800........

Explanation of Benefits *(provided at point of Service By Dr. Doe who collects real time adjusted co-pay avoiding balance billing and allowing collection at time of service as well as reinforcing benefits of Dynamic Co-Pay adjustment) Can be printed hard copy, downloaded from server collating data inputs or electronically distributed via mobile app or web)

Service Information:

| | Date of Service | Amount Billed | Not Covered | Covered |
|---|---|---|---|---|
| Dr. John Doe Medical Wellness Office Visit | 05/04/12 | $175.00 | $25 (1) | $150.00 |

Coverage Information:

142

| | | | |
|---|---|---|---|
| Totals | $175.00 | $25.00 | $150.00 |
| PPO Contract Reduction | | -$25.00 | 146 |
| Deductions | | | |
| Co-payment Amount | $5 | 0.00 | |
| Co-Payment Credit Seat Belt Compliance (auto black box data) | | -$10.00 | |
| Co-Payment Credit Participation Diabetes Education | | -$10.00 | 147 |
| Co-Payment Credit Controlled Blood Sugar (Hgb A1c≤(7.0) | | -$10.00 | |
| Co-Payment Credit On Time Fill of Diabetes Medications | | -$10.00 | |
| Co-Payment Credit Influenza Vaccine Received | | -$10.00 | 148 |
| Total Co-Payment Credits | | $50.00 | |
| Co-Payment you owe your provider (2) | | $0.00 (It's free; Keep up the good work! | |
| | | * (dynamic co-pay reinforces optimal behaviors) | |
| Total Covered Benefits Paid To Dr. John Doe | | $150.00 | 149 |
| Total Amount owed by You | | $0.00 | |

(1) Your Health Plan has a contract with Dr. Doe limiting the amount he can charge for an office visit to $150.00. He may not bill any additional amounts to the Health Plan or to you.
(2) Want to Save More and Stay Healthy; Save on your next prescription refill co-payment; Go To Portal URL and take the diabetes self test. Pass the test and get your insulin filled with no co-payment; you save $30.00!

144

*(Items marked with an asterisk are for explanation and may be omitted from EOB)

Questions on your Co-payment call the Health Plan office or go to our Web Portal at Portal URL and see your benefits in greater detail and learn about other ways to stay healthy and lower your co-pay costs. You may be eligible for a reduction on your Co-Premium. See Portal URL for additional ways to stay healthy and save!

FIG. 9

HEALTH CARE INCENTIVE APPARATUS AND METHOD

FIELD

The invention relates generally to methods and apparatus for health care administration. A more particular embodiment of the invention relates to methods and apparatus for health care cost assessment.

BACKGROUND

Health plans provide coverage to enrolled eligible participants in consideration of premiums paid that are utilized to fund costs incurred by the plan. A "health plan" or "plan" as used herein generally refers to a contract of insurance or similar agreement detailing covered services, plan design, requirements for accessing benefits and/or the like. A "participant" generally refers to a person covered under a specific plan of group or individual insurance or similarly subject to a similar agreement. A "premium" generally refers to an amount paid in consideration for an insurer or health plan providing health care insurance coverage or the like.

In the case of many plans sponsored by a payor, such as but not limited to employer sponsored or governmental plans, the cost of coverage with regard to premiums paid is split in a predetermined and mutually agreed upon fashion between the participant and a payor. A "payor" generally refers to the entity that is contractually responsible or otherwise responsible for providing health care coverage to a participant. This split typically takes place in the form of co-premium or co-insurance charges. A "co-premium" is the amount of premium paid by a participant (e.g., an employee) when procuring health care coverage through an employer sponsored or administered plan, with the balance of premiums being paid by the employer or other third party, whether referred to as "co-premium" in a plan or by another term. "Co-insurance" refers to the percentage of charges that a participant is required to pay other than deductibles or co-payments, whether referred to as "co-insurance" in a plan or by some other term.

Cost of claims is split in a predetermined and mutually agreed upon fashion between the participant and the plan. A "deductible" refers to an amount of first dollar charges that must be paid by a participant before the plan incurs liability for costs incurred in relation to the provision of a covered service, whether referred to as a "deductible" in a plan or by some other term. A "covered" product or service refers to a health care service, drug, or durable medical equipment or other product or service that is eligible for reimbursement under an insurance plan. A "co-payment" refers to the first dollar amounts required to be paid by a participant when procuring a good or service, such as but not limited to a physician office visit, obtaining a covered prescription drug, etc., whether referred to as "co-payment" in a plan or by some other term.

Cost sharing methodologies typically have included either a fixed dollar amount co-insurance deductible or co-payment, or a fixed percentage of total cost of a product or service. A "fixed co-payment" generally refers to a specific designated dollar amount required of a participant when procuring a covered product or service, and a "percentage co-payment" generally refers to a specific first dollar percentage of the cost of product or service required to be paid by the participant.

Co-premiums (the cost sharing of the actual cost of procuring insurance coverage) are either debited from employee paychecks or billed and collected from the participant at regular intervals. Cost sharing with regard to premiums is typically agreed upon in advance of or at the beginning of a benefit year utilizing a variety of methodologies depending upon the type of plan (e.g., contract of coverage, collective bargaining agreement (CBA), etc.). Employer plans may have an agreed upon structure embedded within a CBA, or through the application and consent process required to become a participant in the plan (employer sponsored plans), enrollment in certain governmental plans, or as part of the enrollment process for obtaining private insurance.

The total premium cost is determined in a variety of ways depending upon the type of plan. In the case of employer sponsored plans, the cost of coverage is usually actuarially determined for the entire insured population, and based upon CBAs or other requirements predicate to enrolling in a given plan, the costs of premiums are divided between the participant and the employer. In the case of private insurance not obtained through an employer or governmental program, costs of coverage are dependent upon underwriting processes that look at risk in the form of demographic factors and where permissible incorporate "risk" algorithms prior to enrollment. Premiums are usually set or guaranteed for a specific period of time such as a plan year, and premiums are collected on a set schedule. There is not a mechanism in place to modify co-premiums and co-insurance on a more frequent basis.

Plans can provide coverage to enrolled eligible participants for health care items such as pharmaceuticals. "Pharmaceuticals," "medications," or "drugs" are used interchangeably herein. For instance, medications typically taken outside of a hospital or outpatient facility conventionally are covered under a health plan's pharmaceutical benefit with medications that are given in an outpatient center physician's office, or hospital typically covered under a Major Medical benefit packet of the plan. Without regard to which benefit pocket applies, most plans or insurance companies maintain a list of covered medications known as a formulary.

Participants usually are required to pay for a portion of a medication's cost (a first dollar contribution), and accordingly the formulary in addition to designating which drugs are covered also indicates what portion of the total cost will be paid for by the participant via a fixed co-payment or co-insurance, with the balance of total cost paid by the plan. Cost sharing methodologies typically have been either a fixed dollar amount co-payment (fixed co-payment), or a fixed percentage of total cost co-payment (percentage co-payment), which is usually updated on an infrequent basis and collected from the member at time of procurement at a point of purchase, such as but not limited to a retail, mail order, or specialty pharmacy.

Typical co-payment structures include several categories or tiers of co-payments within the formulary, with each covered medication included in the formulary being assigned to a specific co-payment tier or level requiring the same fixed dollar amount or percentage of the absolute cost to be paid by the participant. Tier placements, which determine how much a participant is required to pay of the total cost, are usually based on the total cost of the drug and/or the perceived therapeutic benefit of a particular medication, and serve to determine the absolute dollar and relative percentage of total costs paid by the plan and participant.

Plans contract with companies (e.g., pharmacy benefit managers or PBMs), who in turn contract on behalf of the plan with retail, mail order, and specialty pharmacies to obtain preferred total pricing for medications and administer the plan design. Pharmaceutical manufacturers sell their medications either directly or through a variety of distributors to retail, specialty, and mail order pharmacies. The pharmaceutical manufacturers through distributors then provide the medications to pharmacies or specialty pharmacies for sale to who in turn provide the medications to participants and collect the co-payments or co-insurance, as well as balance bill the balance due from the health plan to the PBM. The PBM in turn collects the balance from the plan and remits the balance to the pharmacy.

While medications are in most cases not sold directly by the manufacturer to the end user (participant), most pharmaceutical manufacturers market their products directly to participants (e.g., via television, print, online, etc.), and utilize a variety of techniques to induce participants to seek out specific brand name drugs through their physicians and healthcare providers, typically without regard to cost and comparative effectiveness. Example marketing techniques include free sampling and coupons targeted at reducing the participant's co-payment while leaving the health plan's cost unchanged. A "coupon" as used herein generally refers to a promotional device, such as provided by a manufacturer or provider, designed to provide and deliver incentives to purchase a drug or other medically related health item to the end user (i.e. plan participant).

By artificially reducing the participant's portion of the total cost of the drug through the use of coupons, the pharmaceutical manufacturers many times eliminate cost differentials between their drug and alternate generic or brand choices, which alternate choices may be equally or more effective for the participant's condition and significantly less expensive in terms of total cost and cost borne by the health plan.

SUMMARY

An embodiment of the invention provides, among other things, a method for providing a cost modification of a health care item for a subject. In an example method, a request is received for a health care item from a point of purchase of the health care item. Cost adjustment data is received from at least one source. The cost adjustment data is used to determine a cost modification for the health care item. The cost modification is communicated to a point of purchase of the health care item. Preferably, the cost adjustment takes place in substantially real time.

Another embodiment of the invention provides, among other things, a method for adjusting a cost for a health care item purchased under a health care plan. In an example method, a request is received for the health care item. For at least one product option corresponding to the requested health care item, a total cost for the product option, a cost distribution for the total cost, and coupon amount related to the product option are received. The cost distribution comprises a health care plan cost and one of more of a co-payment amount, a co-insurance amount, and a deductible amount. One or more of the co-payment amount, the co-insurance amount, and the deductible amount is adjusted based on the coupon amount, and the cost distribution is adjusted based on the adjusted co-payment amount, co-insurance amount, and/ or deductible amount. The adjusted cost distribution for the product option is delivered to a recipient. Preferably, this method takes place in substantially real time. Also preferably, the recipient is at a point of purchase for the health care item.

Another embodiment of the invention provides, among other things, a method for adjusting a cost for a health care item purchased under a health care plan. A request is received for the health care item. For at least one product option corresponding to the requested health care item, a total cost for the product option and a cost distribution for the total cost are received. The cost distribution comprises a health care plan cost and one of more of a co-payment amount, a co-insurance amount, and a deductible amount. Subject compliance data is also received. The co-payment amount, the co-insurance amount, and/or the deductible amount are adjusted based on the compliance data, and the cost distribution is adjusted based on the adjusted co-payment amount, co-insurance amount, or deductible amount. The adjusted cost distribution for the product option is delivered to a recipient. Preferably, this method takes place in real time. Also preferably, the recipient is at a point of purchase for the health care item.

Another embodiment of the invention provides, for a health plan, a method for adjusting a cost distribution of a premium. A request is received for a premium payment amount. A total premium cost and a cost distribution for the premium are received. The cost distribution comprises a co-premium amount. Subject compliance data is also received. The co-premium amount is adjusted based on the subject compliance data. The cost distribution is adjusted based on the adjusted co-premium amount. The adjusted cost distribution is delivered to a recipient. Preferably, this method takes place in real time.

BRIEF DESCRIPTION OF THE DRAWINGS

FIG. 7 shows an example Explanation of Benefits (EOB) for a drug provided at a point of purchase by a pharmacist, illustrating a dynamic cost adjustment based on a coupon amount;

FIG. 8 shows an example Explanation of Benefits (EOB) for a drug provided at a point of purchase by a pharmacist, illustrating a dynamic cost adjustment based on a coupon amount and example subject compliance data;

FIG. 9 shows an example Explanation of Benefits (EOB) for a drug provided at a point of service by a physician, illustrating a dynamic cost adjustment based on example subject compliance data;

DETAILED DESCRIPTION

Figure 1:
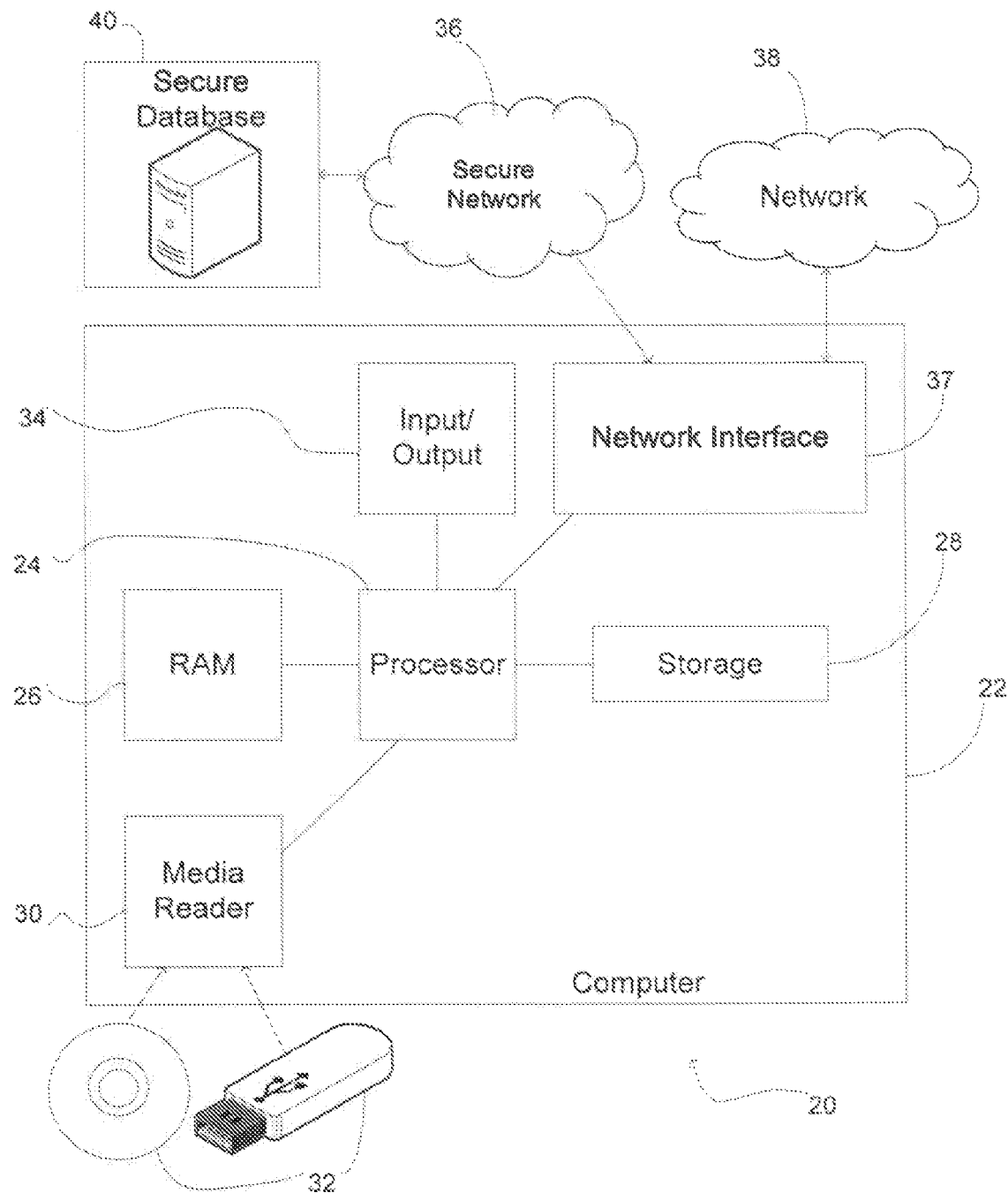
FIG. 1 shows an apparatus for carrying out an embodiment of the invention.

An example embodiment provides a method for providing a cost modification of a health care item for a subject. "Cost modification" can refer to any alteration or adjustment of a total cost or an allocation of total cost between a participant and a plan, a payor, or other third party (referred to herein as "cost distribution"). "Health care item" refers broadly to any health care product, including covered services and insurance plan premiums.

In an example method, a request is received for a health care item. This request can be received by a participant, a provider, a payor, a plan administrator (including services for health care plan administrators), etc., or any combination of these entities. A "provider" generally refers to a person or entity that provides a health care product or service to a participant. The request can be received from any of various locations, including but not limited to, an online participant via an online portal (e.g., a web portal), from a point of purchase (including point of service) of a health care item, from a portal linking a provider to a service, from a portal linking a payor to a service, etc.

Cost adjustment data is received from at least one source. "Cost adjustment data" generally refers to any information that can be used to calculate a cost modification from an original cost, e.g., as set out in a plan. Example cost adjustment data includes, but is not limited to, plan design information, eligibility files, which provide, among other things, information relating to a participant's eligibility for a plan, or in the individual features thereof, coupons, and the like. As used herein, the term "coupon" is intended to be broadly interpreted and to generally refer to a discount for a particular product or service. One example of a coupon is a paper or electronic message specifying a discount amount for a specified brand name product or service. An additional type of cost adjustment data is subject compliance information or data, which generally refers to any information that can be used to determine whether a participant is or is not complying, or is complying in an amount, with one or more health incentives keyed to behavior that is likely to improve participant health or facilitate treatment outcomes.

Health incentives can be incentives set out, as a non-limiting example, as part of a lifestyle management program or a disease management program. A "lifestyle management program" refers to a program designed to address specific lifestyle issues (e.g., obesity, smoking, recreational drug use, stress management, etc.) with some involving counseling, education or the like to facilitate optimal and healthy personal health habits. A "disease management program" refers to a program designed to optimize participant education and/or care with regard to a specific disease (e.g., diabetes, asthma, congestive heart failure, etc.).

The source of the cost adjustment data can be any source capable of providing the data, including eligibility files, plan design, and sources of subject compliance information, such as plan claims information from a claims database, medical records, including electronic medical records (EMR), personal health assessments (PHA), etc. In many embodiments the data is electronically stored and available for retrieval and communication over a network. A "claims database" generally refers to a record of charges, diagnoses, and payment for services maintained by a payor or plan. An "electronic medical record" generally refers to an electronic database containing health information such as laboratory data, office visit notes, and other records maintained by a provider. A "personal health assessment" generally refers to a questionnaire completed either on paper or electronically by a participant designed to gather data with regard to a participant's current state of health and lifestyle choices. An additional source for cost adjustment data can include a source of coupons (e.g., a pharmaceutical drug manufacturer). As an example, a source can be embodied in a database maintained to contain various coupons/discounts for a plurality of drugs.

The cost adjustment data is used to determine a cost modification for the health care item. Preferably, this determination is dynamic. "Dynamic" generally refers to being performed in substantially real time using current data. As used in the context of some embodiments, it generally refers to an alteration from a fixed dollar or fixed percentage basis that is incorporated into a plan design or an adjustment based on a substantially regular schedule. Examples of determining a cost modification are provided herein, though the present invention is not intended to be limited to the specific determinations disclosed herein.

The cost modification is communicated to a recipient, with communication in some embodiments including electronic or other form of delivery. A "recipient" is any person, entity or party (either directly or as represented by a computer, display, address, etc.) that can receive the cost modification. Non-limiting example recipients include the participant, the provider, the plan administrator, or the payor, including a computer or other electronic receiving device operated or associated with any of these entities. Communicating can include, but is not limited to, sending cost modification information in digital or electronic form over a network, which received information is stored (e.g. in non-volatile memory or storage, including on any suitable non-transitory medium), displayed, printed, or otherwise presented to the recipient. Another example of communicating is printing and sending printed cost modification information. Yet another example of communicating is causing output to be created, with an example including causing a display to display the cost modification information. Still another example of communicating is sending an audio and/or visual output message to the recipient via telephone or other communication device (e.g., voice, text, online portal, social media, mobile device etc).

The cost adjustment data in a particular example embodiment includes one or more of a coupon relating to the health care item, and a plan design. As used herein, "at least one of" or "one or more of" is intended to refer to either one of a group of items, an alternative one of a group of items, or a combination of two or more of the group of items. A particular example requester is the participant. A particular example source for the cost adjustment data includes one or more of the participant and a provider. A particular example recipient is located at a point of purchase, which can include a point of service.

In an additional embodiment of the invention, a method is provided for increasing health care subject compliance. A "health care subject" or a "subject" refers to a participant for whom a health care incentive can be employed to adjust a cost distribution for a health care item. In an example method, health care instructions are provided to the subject. These health care instructions can include, but are not limited to, any instruction relating to a health incentive, and can be communicated or delivered to the subject in any suitable way (by written, oral, or online communication, from a provider, from a plan administrator, and are incorporated into the plan document etc.) A "plan document" generally refers to a comprehensive document detailing (preferably) all aspects of covered services including but not limited to plan exclusions and limitations, plan and participant obligations, cost sharing, and procedures for filing claims and appeals, etc. The subject's compliance with the instructions is monitored, which in an example embodiment can be done via obtaining subject compliance information. A cost distribution for a health care item is dynamically adjusted based on the subject compliance with the instructions. The adjusted cost distribution is delivered to the subject, for example at a point of purchase, via a web portal, etc.

In a particular example embodiment, the health care item is medication, while in another particular example embodiment, the health care item is a health plan premium, co-pay or deductible with regard to a service provided by a provider. An example adjusting of the cost distribution includes increasing the subject's required portion of the cost distribution for the health care item if the subject's compliance with the instructions is low (or not at all), and decreasing the subject's required portion of the cost distribution if the subject's compliance with the instructions is high. "Low" and "high" values can be set as desired. As an example, they can be determined by incentives as set out in a health plan, and can vary so long as "high" compliance refers to a greater amount of compliance with the health instructions than a "low" compliance. A particular example can include health care instructions to take a medication dosage once daily for 30 days. If the patient doesn't refill a 30 day supply of the dosage until 60 days after receiving, a method of the invention could determine that the compliance was low.

In another example embodiment, a method is provided for adjusting a cost for a health care item purchased under a health care plan. "Adjusting" broadly refers to any adjusting, alteration, changing, amending or editing of a cost, including total cost and/or cost distribution.

In an example method, a request is received for the health care item. A cost adjustment is performed for at least one product option corresponding to the requested health care item. A "product option" generally refers to any health care item that can be provided that is either substantially identical to or is an acceptable substitute for the health care item. For example, the health care item can be a pharmaceutical, and the product options can be the requested pharmaceutical and/or therapeutically equivalent options to the pharmaceutical. In a particular, non-limiting example, if the pharmaceutical is a brand-name drug, a product option can include one or more of the brand-name drug, a competing brand-name drug for the same or therapeutically equivalent drug, and/or a generic therapeutically equivalent of the brand-name drug. A product option as used herein may also include a service, with an example being a medical service. "Therapeutically equivalent" should be broadly interpreted as any medically acceptable substitute, as determined by a health care expert or as otherwise known to include equivalent or identical active ingredient.

For the at least one product option, a total cost is received. "Total cost" refers to the combined cost for the product option to be paid; e.g., a price for the product. A cost distribution for the total cost is received, and this cost distribution includes a plan cost and a participant cost, which can be one or more of a co-payment amount, a co-insurance amount, and/or a deductible amount. Thus, the cost distribution generally includes at least a portion of the total cost that is to be paid by the participant and at least a portion of the total cost to be paid by someone other than the participant (e.g., a plan). A coupon amount related to the product option is also received. The coupon amount may be, for example, a specified economic discount provided on a paper document or an electronic message (e.g., "$25 off of price of Brand X Medication")

Embodiments include a step of adjusting one or more of the co-payment amount, the co-insurance amount, and/or the deductible amount based on the coupon amount. This adjusting can be higher or lower. Based on this adjusting, the cost distribution is adjusted. For example, increasing the co-payment amount, the co-insurance amount, or the deductible amount by part of or all of the coupon amount can cause the plan cost for the product option to correspondingly be decreased. Example methods of adjusting the co-payment or co-insurance are described herein, and those of ordinary skill in the art will appreciate other adjusting methods.

Adjusting the co-payment, co-insurance, or deductible changes the cost distribution between the participant and the plan from the fixed cost distribution set out in the plan. The adjusted cost distribution for the product option is delivered to a recipient. Preferably, the adjusting of the cost distribution is dynamic, and the delivery is to a point of purchase. In an example embodiment, the co-payment or co-insurance can be dynamically adjusted, providing a "dynamic co-payment" or "dynamic co-insurance." These generally refer to a variable co-payment or co-insurance product that can be changed in real time to reflect current incentives and/or current coupon availability in order to facilitate optimal participant health outcomes, and preferably constantly adjust to provide fair sharing of costs of a service in keeping with terms and provisions of a given plan despite inconsistent and changing coupons and incentives.

In an example embodiment, delivering the cost adjustment information can include preparing an Explanation of Benefits (EOB), examples of which are shown and described herein. The EOB in an example embodiment includes the total cost and the adjusted cost distribution for the product option. This EOB is sent to the recipient, e.g., over a network, via mail, via communication device, etc.

In some example embodiments, for at least one additional product option corresponding to the requested health care item, a total cost and a cost distribution can also be received and delivered to the recipient. This cost distribution can be adjusted such as described elsewhere herein, but need not be in all cases. Further, this additional product option may or may not have a coupon (including discounts). By delivering cost distribution information for additional product options, the recipient can compare the various cost distributions, and can select among the various presented product options. Both the adjusted cost distribution for the product option and the cost distribution (whether or not adjusted) for the additional product option can be added to the EOB, and then sent to the recipient, so that the EOB is used to compare the product options.

Receiving a cost distribution can include receiving a plan design. The plan design preferably includes the plan cost and the co-payment amount and/or the co-insurance amount. In an example embodiment in which the health care item includes a pharmaceutical, the health care plan can also include a formulary. In this case, the product options can be selected based on the formulary.

The request can be received from a health provider. Alternatively, the request can be received from a participant, and sent from either a point of purchase or a web portal. By allowing a participant to send the request from a web portal (which may be accessed, for example, from a participant home or mobile device at a time prior to purchase of a product or service), the participant can order a health care item, or merely search for information relating to the health care item to provide better information for a decision. The recipient can be the participant, the provider, and/or a payor.

According to another embodiment of the invention, a method is provided for adjusting a cost for a health care item purchased under a plan. A request is received for the health care item. For at least one product option corresponding to the requested health care item, a total cost and a cost distribution for the total cost are received. This cost distribution includes a plan cost and one or more of a co-payment amount, a co-insurance amount, and/or a deductible amount. Subject compliance data is also received.

The co-payment amount, co-insurance amount, and/or deductible amount are adjusted based on the subject compliance data. This allows, for instance, a participant to benefit from complying with health instructions or otherwise receive incentives (positive or negative). The cost distribution is adjusted based on the adjusted co-payment amount, co-insurance amount, and/or deductible amount, and the adjusted cost distribution for the product option is sent to a recipient. If more than one product option is provided to the recipient, the recipient may be able to select among the provided product options. The adjusted cost distribution may also account for coupons for one or more product options, as shown and described elsewhere herein. For a non-limiting example for pharmaceuticals, the amount to be paid by the participant can be adjusted on a real time basis at point of purchase after processing through a web-based system utilizing multiple procurement pricing factors, including the value of existing pharmaceutical manufacturer promotional coupons and patient assistance programs for each individual drug and manufacturer, as well as being adjusted to support other plan clinical programs initiatives.

Subject compliance information can include, for example, claims information from a claims database, medical records such as EMR, and/or a PHA. Adjusting the cost distribution can include, for instance, decreasing or increasing a copayment based on whether the subject compliance information indicates compliance with a health incentive. Subject eligibility data can also be received, and the cost distribution can also be adjusted based on the subject eligibility data. "Subject eligibility data" generally refers to any information relating to whether the health plan participant is eligible for payment assistance under the health plan for the health care item. Such information may include, but is not limited to, whether the participant still has valid coverage under the health plan. Eligibility data may also state whether the participant is eligible for an incentive program.

Delivering the adjusted cost distribution can include preparing an EOB including the retrieved total cost and the adjusted cost distribution for the product option. A portion of retrieved subject compliance information can also be included in the EOB. In this way, the recipient, such as the participant, is able to review the resulting cost information, and relate it to the particular incentive that resulted in the adjustment. This further provides incentive to a participant to comply with health instructions, for instance to reduce his or her portion of a cost for a health care item.

A request can be received from the participant, and the recipient can be the participant, in an example embodiment. The request for instance, can be sent from a web portal. Using this web portal, additional subject compliance data can be received from the participant, and the cost distribution can be readjusted based on this additional data. The readjusted cost distribution can be delivered to the participant.

Thus, if a participant is researching a purchase of a health care item under a plan, the participant can update his or her subject compliance information, either based on actual data, or even hypothetical data, and receive results to provide further incentives to comply with health instructions. As one particular non-limiting example, if subject compliance data indicates that a participant is not taking a certain medication at an instructed interval, and thus an adjusted cost distribution indicates that the participant is responsible for a higher required portion of a total cost for a health care item, the participant can hypothetically determine what would happen to his or her required portion if he/she were to begin properly taking the medication. This provides feedback to the participant.

In another example embodiment, a method is provided for adjusting a cost distribution of a premium. A request is received for a premium payment amount. A total premium cost is received, as well as a cost distribution for the premium. The cost distribution includes one or more of a co-premium amount paid by the participant and portion of the premium to be paid by an employer or other third party. This cost distribution can allocate premium costs split between co-premium paid by a participant and the balance paid by the employer or other third party. Subject compliance data is also received.

The co-premium amount is adjusted based on the subject compliance data. The cost distribution is then adjusted, and the adjusted cost distribution is delivered to a recipient. The adjusting of the cost distribution preferably is dynamic, which in some embodiments includes real-time calculation based on then-current data.

Delivering the adjusted cost distribution can include, for instance, preparing an EOB that includes the received total premium cost and the adjusted cost distribution. The EOB is then sent to the recipient. This EOB can also include health education information to encourage a participant to comply with one or more health instructions and receive incentives that can reduce the participant's required portion of the total premium cost.

Receiving a cost distribution can include receiving a plan design that includes the premium cost, as well as the (current, fixed) co-premium amount. The request can be received from a participant and/or a plan administrator, and the recipient can similarly be the participant and/or plan administrator. In a particular example method, the request is received from a participant from a point of payment for the premium and/or an online portal (e.g., a web portal).

The subject compliance information can include, but is not limited to, claims information, medical records, and/or a PHA. In an example embodiment, the adjusting includes dynamically decreasing or increasing the co-premium amount based on whether the subject compliance information indicates compliance (which can also includes indicating noncompliance) with a health incentive. Subject eligibility data can be received in an example embodiment, and the cost distribution can be adjusted further based on this data.

In an example embodiment, if the request is received from a plan participant, and the recipient is also the participant, additional subject compliance data can be received from the participant, e.g., via the web portal. The cost distribution can then be readjusted based on the additional subject compliance data, and the readjusted cost distribution can be delivered to the participant. In this way, the participant can receive feedback based on actual or hypothetical additional subject compliance data, further providing incentives for complying with health care instructions.

Thus, in an example embodiment, optimal outcomes can be achieved by utilizing cost adjustments including, but not limited to, providing minimized payor costs, as well as channeling the participant to optimal treatments and maximizing clinical management programs.

Before discussing particular features of some further example embodiments in detail, it will be appreciated that the present invention may be embodied in a method, system, and/or computer program product. For example, a method according to one embodiment may be carried out by one or more entities using computers or by one or more computers executing steps of the invention, and a program product of the system may include computer executable instructions that when executed by one or more computers cause one or more computers to carry out steps of a method of the invention. The program instructions of embodiments of the invention may be stored on one or more computer readable media (such as a transitory, volatile, non-transitory or non-volatile memory medium, with examples including magnetic, optical, electrical, chemical, and the like), and may cause results of computations to be stored in one or more memories and/or to be displayed on displays. Computers as contemplated by the invention are to be broadly interpreted, and include, for instance, processor based devices of all sizes and configurations, including servers, desktop computers, laptops, tablets, portable communication devices (including smart phones), portable gaming and entertainment devices, and the like.

Preferred embodiments will now be discussed with respect to the drawings. From the preferred embodiments, artisans will recognize additional features and broader aspects of the invention. As an example, the sequence of some or all steps performed in some embodiments may be readily altered. Example embodiments are therefore appreciated to be illustrative in nature, and shall not be considered to limit the scope of the invention.

FIG. 1 shows an example apparatus 20 that can be used to perform one or more methods of the claimed invention. The apparatus 20 includes a computer 22 having a processor 24 suitably configured or otherwise instructed to perform methods according to the present invention. An example computer 22 further includes memory (e.g., random access memory (RAM)) 26, storage (e.g., non-volatile storage, disk drive storage, etc) 28, and can further include one or more media readers 30 for reading non-transitory computer readable media 32. Suitable input/output devices (e.g., displays, keyboards, mice, touch screens, controllers, etc) 34 can be used for interfacing with the computer 22. One or more network interfaces 37 for networks 36, 38, e.g., for local area network ("LAN"), wide area network ("WAN"), mobile network, Internet, etc., whether secured or unsecured) is provided for accessing and interfacing with one or more networks. A suitable bus (not shown) may be used for communication of the various computer components as will be appreciated in the art.

The computer 22, for instance, may be a personal computer ("PC") a server, dedicated terminal, laptop, mobile device, or any other suitable computer or processor that is suitably configured to perform methods according to the invention. The computer can additionally interface with a secure network 36 (or network 38) for abstraction of multiple data sources for requesting, receiving and sending various types of information according to example methods. The networks 36 and 38 may be any of a local area network (LAN), wide area network (WAN), wired, wireless, or the like. They may include the internet, a PSTN, or the like. In a non-limiting example, a cloud based system or a server/client configuration may be used to securely extract data from one or more data sources. A secure database 40 may be either directly linked to the computer 22 or linked via the secure network 36 for storing items such as, but not limited to, coupon (including discount offers) and other product options for health care items.

Figure 2:
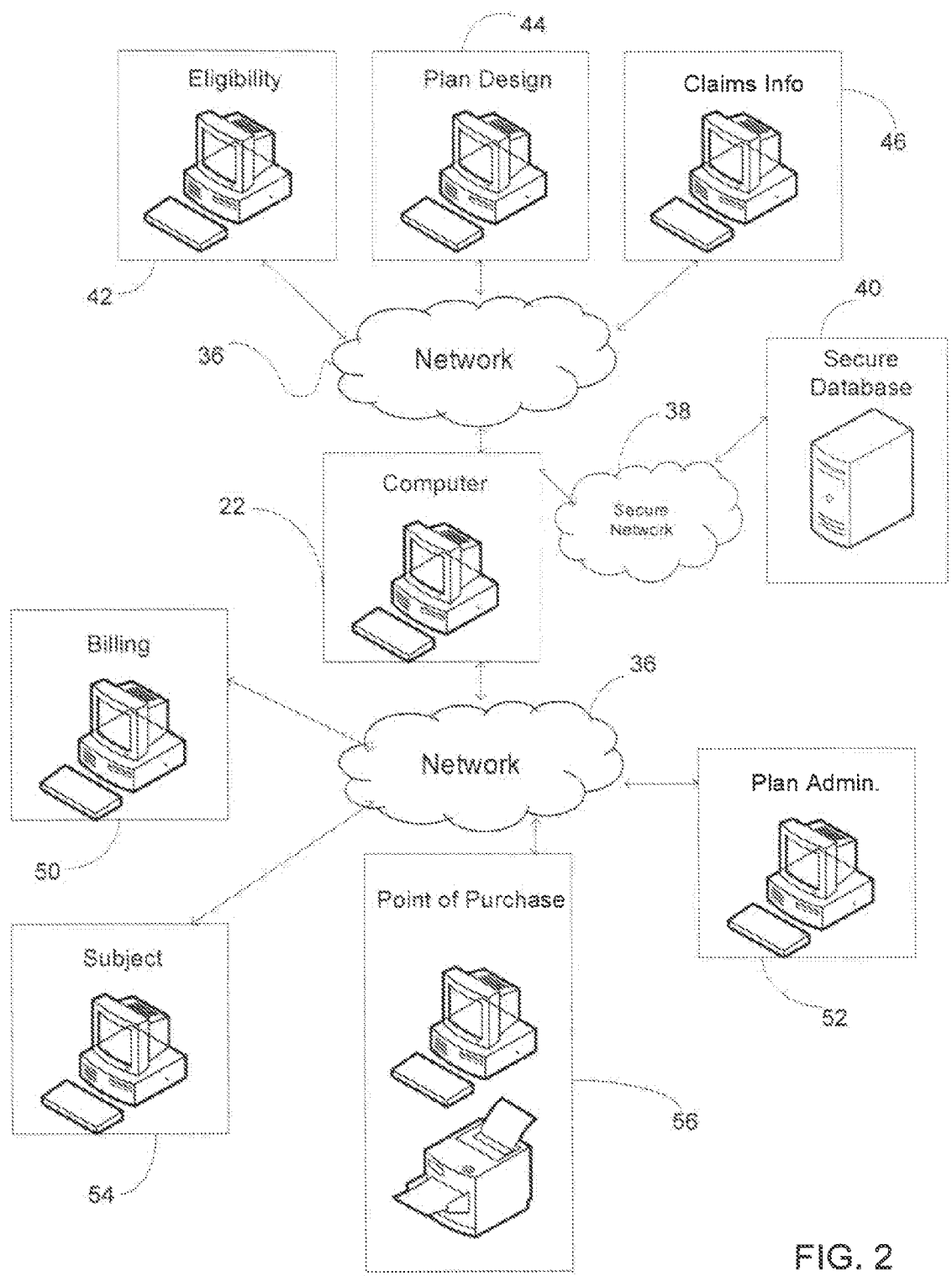
FIG. 2 shows an example network for carrying out an embodiment of the invention.
Figure 3:
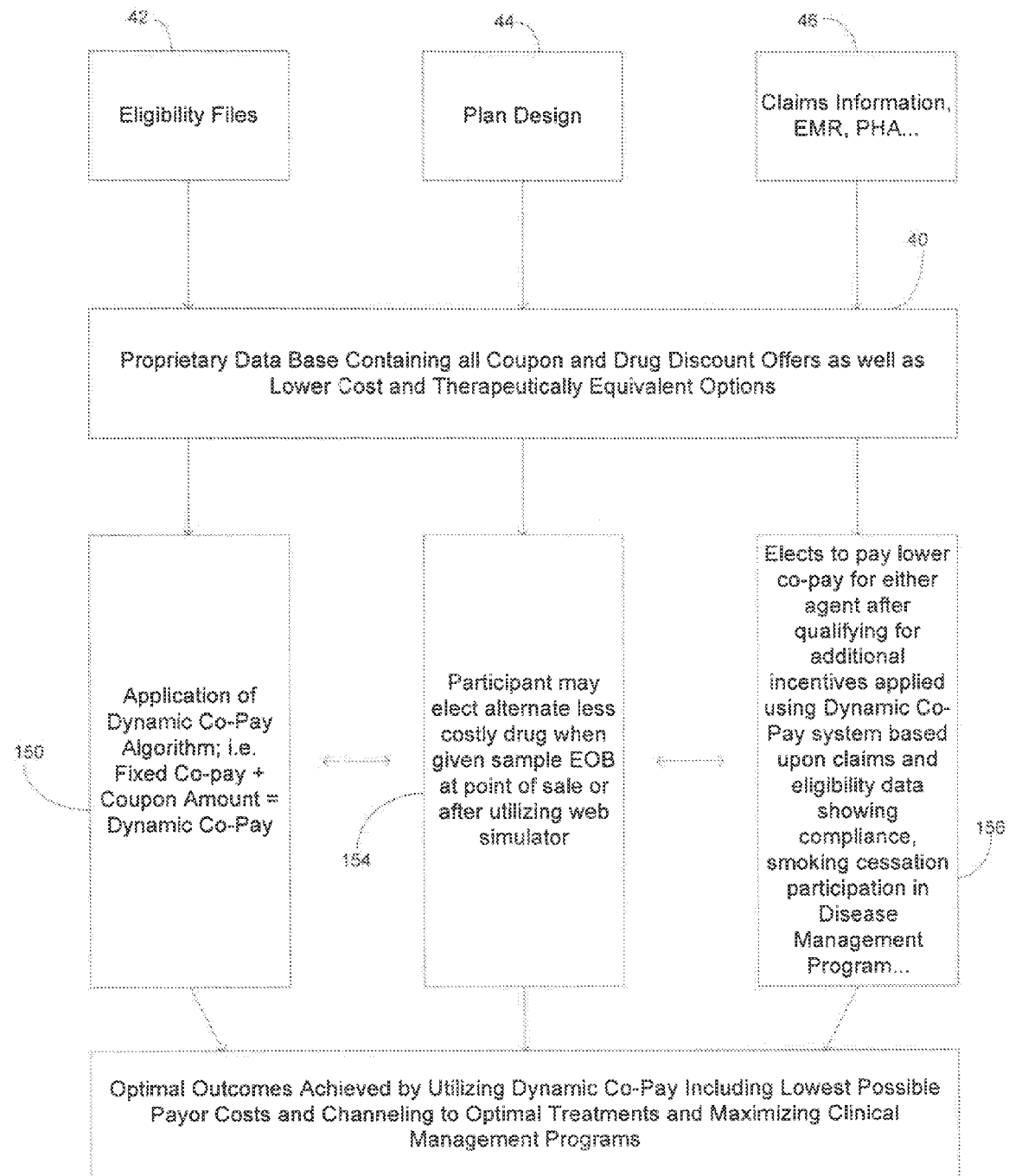
FIG. 3 shows information flow during an embodiment of the invention for adjusting a co-payment for a drug.

FIG. 2 shows an example network for performance of one or more example methods, and FIG. 3 shows an example information flow for a particular example co-payment adjustment process for a drug including portions of the network. In a non-limiting example embodiment, the computer 22 is operated as part of a plan management or claims adjudication system. The computer 22 can communicate with sources for eligibility files 42, health plan designs 44, and subject compliance information such as but not limited to prior claims information 46 via a suitable network, which preferably is a secure network. "Network" as used herein can refer to one or multiple linked networks.

In an example embodiment, the database 40 is maintained on a secure server, and is seamlessly integrated with the plan specific benefit data 44 for each specific health plan, as shown in FIG. 3. This plan design data can include, for instance, scheduled co-payments and co-insurance, updated eligibility files, and/or PBM contracted pricing claims routing and other information. The plan design source 44 may be a server stored at a plan administrator, a third party administrator, or self administered plan office or data warehouse.

The computer 22 may directly receive the data in abstracted form from one or more sources 42, 44, 46, and/or may be configured to abstract the information from other forms from the sources. Methods of abstracting or parsing, organizing, and processing data from digital data (e.g., from databases, spreadsheets, data search, etc.), or from documents (e.g., using optical character recognition (OCR), data search, or other methods), etc., will be appreciated by those of ordinary skill in the art. "Receiving" can include direct or indirect receiving, and can include direct receiving of abstract data needed to perform one or more example methods, and/or can include receiving data which is then processed to provide the abstracted data. Example embodiments can be secure and web based, and can be administered via cloud, which allows for secure abstraction of multiple data sources, using any suitable method and arrangement as appreciated by those of ordinary skill in the art.

Subject compliance data 46 can be obtained or integrated from any of multiple sources. An example system integrates data from one or more sources, including one or any combination of insurers, third party administrators, health care providers, and the like. The subject compliance data 46, which in some embodiments may include some or all of prior claims information, medical records, personal health assessment, product or service purchase history, exercise data, diet data, weight data, performance data, or the like, may be stored on a server at a plan administrator, a third party administrator, a provider, or data warehouse, or other locations. EMR data can include, but is not limited to, biometrics screening and laboratory data. PHA information can include, but is not limited to, self reported data derived from the participant via the PHA and/or other surveys. Other sources of subject compliance data can include, but are not limited to, integrated program participation data from disease and condition management, lifestyle management vendors, participant input data, health or physical fitness club data, or the like. Other subject compliance data can include risk data such as data assessing life style risk factors, such as, but not limited to, auto black box data, data relating to seatbelt utilization, tobacco use, alcohol use, diet, etc. (where legally permissible).

The computer 22 preferably is securely linked to the secure database 40, which includes information providing coupon or discount amounts. Further, the database 40 can include product options, such as but not limited to data for therapeutically equivalent drugs for pharmaceuticals. Therapeutically equivalent options can have a lower total cost, but need not in all embodiments. The database 40 can include other information as well for use by the computer, and thus a database is not intended to be limited to a database having the information disclosed herein. The computer 22 also can be linked via a network (e.g., a network, 36, secure network 38, or secure link or secure path over an open network such as a wide area network or the Internet) to other sources, including a source for billing information 50 and/or a source for plan administration 52.

Further, the computer can be linked via the network (which can be the same network or a different network) to the participant 54. A link to the participant 54 can be provided, for instance, via a web portal, which is delivered to a participant-accessible computer or located at a point of purchase 56 of a health care item. A point of purchase can be a provider, healthcare facility pharmacy or any point of provision of care or dispensing of a health care item 56. Non-limiting examples of a point of purchase include a physician office, a hospital, a pharmacy, a point of purchase for health care plan premiums, or generally any location from which a relevant health care item can be purchased.

Figure 4:
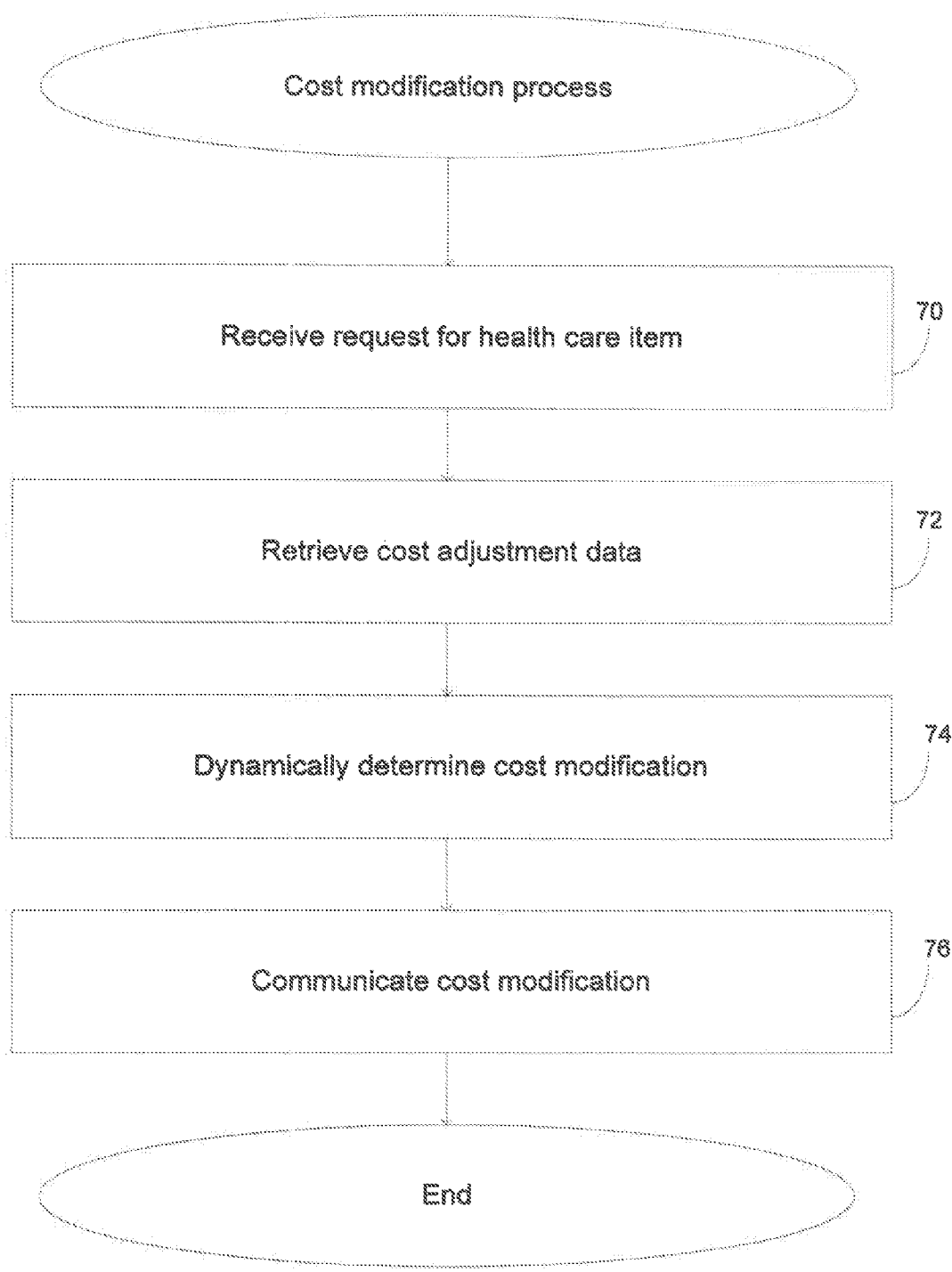
FIG. 4 shows an example embodiment cost modification process.

FIG. 4 shows example cost modification steps. The request is received for the health care item (step 70), such as the computer receiving a request for the health care item over a network from the participant or at a point of purchase. Cost adjustment data is received (step 72) from sources such as, but not limited to, the eligibility files source, the plan design source, the subject compliance data source, the billing source and the plan administration source. A cost modification is determined (step 74), preferably dynamically, using the cost adjustment data. This cost modification is then delivered (step 76) to the recipient.

Figure 5:
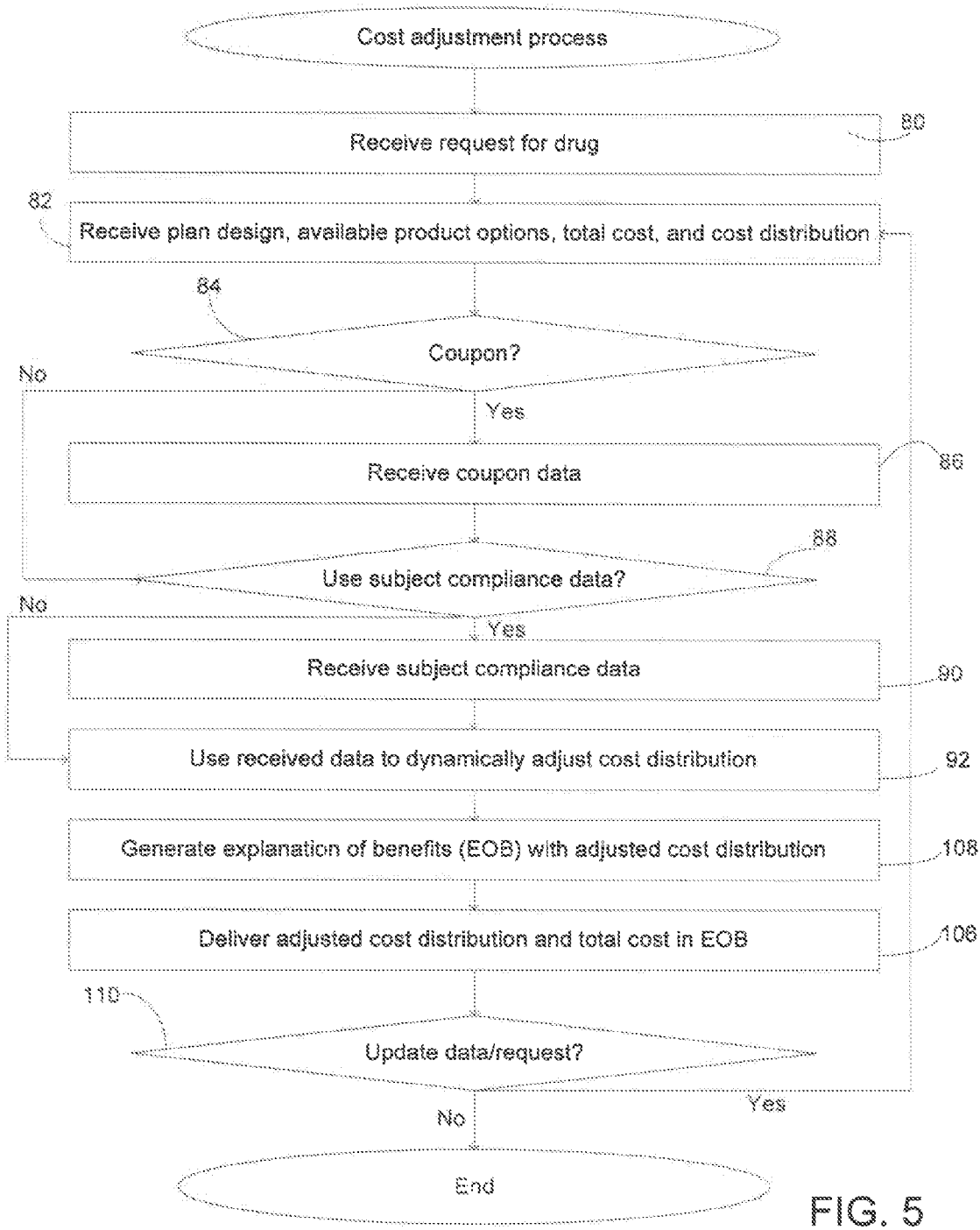
FIG. 5 shows an example cost adjustment process for a drug, which can be extended to other health items.

FIG. 5 shows particular example steps for adjusting a cost for a health care item. In FIG. 5, the example health care item is a drug. However, those of ordinary skill in the art will appreciate that the method can be extended to other health care items (including not only products but also services).

After receiving a request for the health care item (step 80), the computer receives database information containing coupon and drug discount offers as well as therapeutically equivalent options (preferably, but not necessarily, having a lower total cost or a lower plan cost than the requested item) (step 82). For instance, the total cost of a drug to be dispensed can be provided by a pharmacy through the pharmacy benefit manager (PBM), which can have a contract with the pharmacy specifying pricing. Alternate drugs and pricing can be maintained in the database, which preferably contains evidence-based choices that have defined pricing provided from the PBM. The eligibility files can be received to determine if a participant is eligible for the health care plan, and/or if the participant is eligible for incentives relating to the health plan.

The plan design information is also received, which can include, for instance, list of covered medications, e.g., a formulary The plan design can also include a distribution of total costs for particular product options within the formulary, as well as information such as requirements for procurement, e.g., need for prior authorizations, etc. As described elsewhere herein, participants usually are required to pay for a portion of a health care item's cost, referred to as a first dollar contribution co-pay. The formulary preferably includes information designating which items (in this example, drugs) are covered under the health plan, as well as a cost distribution providing what portion of the total cost will be paid for by the participant via a fixed co-payment or co-insurance, with the balance of total cost paid by the plan. A typical co-payment structure includes several categories or "tiers" of co-payments with the formulary, with each covered medication in the formulary being assigned to a specific co-payment tier or level requiring the same fixed dollar amount or percentage of the absolute cost to be paid by the participant. Conventionally, the tier placements determine how much a participant is required to pay of the total cost, and this is usually determined by the total cost of the drug and/or the perceived therapeutic benefit of a particular medication. The cost distribution includes the total cost as well as the proportions (in either absolute dollar, relative percentage, or the like) of total costs paid both by the plan and the participant. An example cost distribution includes, for example, a plan cost, and a co-payment amount, a co-insurance amount, and/or a deductible amount for the item. This cost distribution, for instance, is fixed by the plan, regularly updated by the plan, or may be a cost distribution that was previously adjusted by any methods disclosed herein.

Table 1 below shows a non-limiting example cost distribution data that the computer may receive from the plan design, including a fixed dollar co-payment.

| Total Cost Of Drug | Tier 3 Co-Payment | Member Cost | Plan Cost of Drug |
|---|---|---|---|
| $200.00 | $50.00 | $50.00 | $150.00 |

As shown in Table 1, for a total cost of a particular drug of $200, which drug is in "Tier 3" of the health plan's formulary, a co-payment is set (e.g., set by the plan or previously adjusted) at $50.00. This $50.00 amount is a fixed dollar co-payment. Thus, the participant portion of the cost for this drug is $50.00 and the plan portion of the cost is $150. It is also contemplated that the cost distribution can include additional distributed portions of the total cost.

According to example embodiments of the invention, coupon data, subject compliance data, or both are used to adjust a cost distribution for a health care item. For example, if a coupon is to be considered (step 84), a coupon amount that is related to the particular product option is received (step 86) from a source such as the database. Similarly, if subject compliance data is to be used (step 88), subject compliance data is retrieved (step 90).

Figure 6:
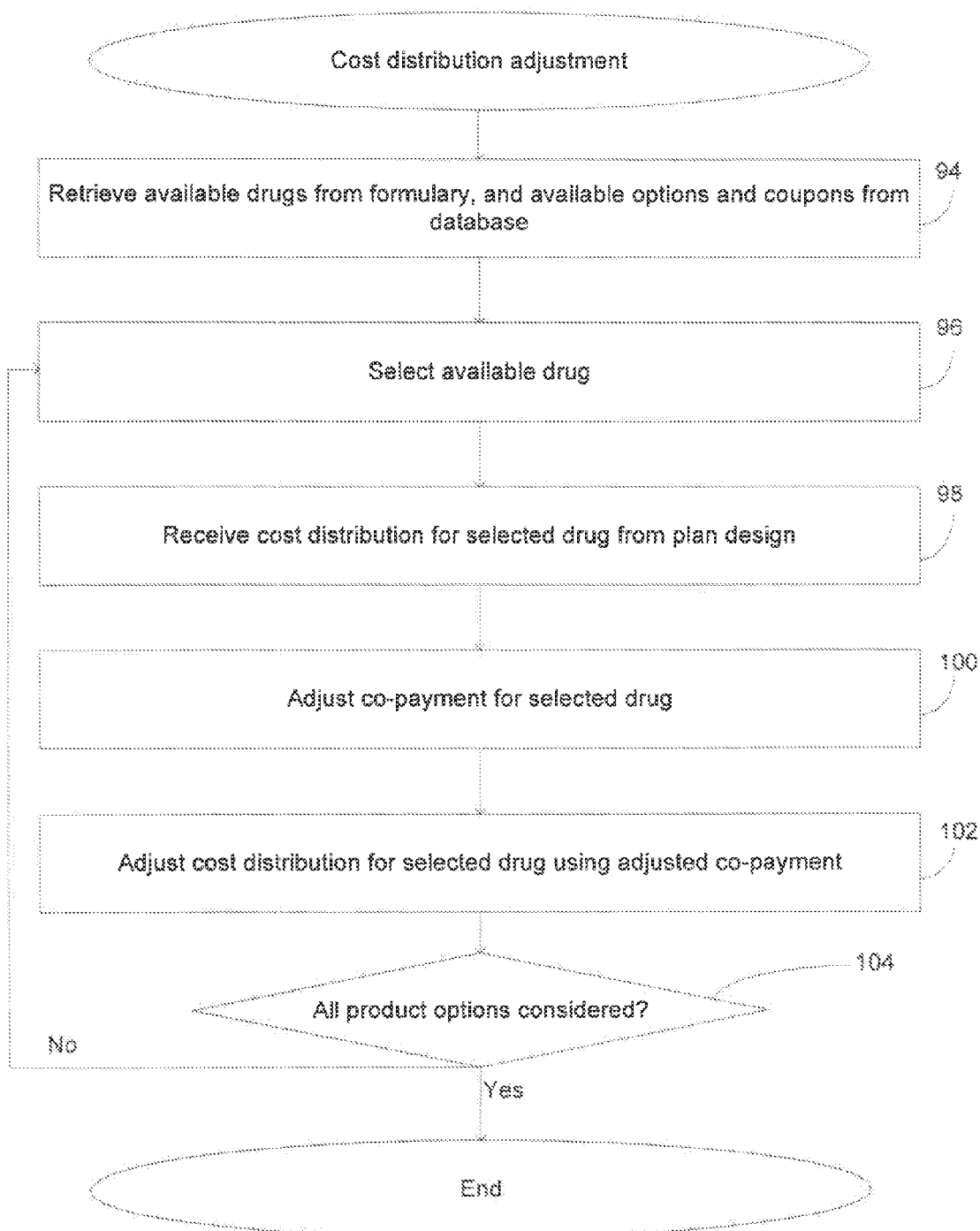
FIG. 6 shows an example cost distribution adjustment for a drug, which can be extended to other health items.

The received data is used to adjust the cost distribution (step 92). Preferably, this adjustment is dynamic. FIG. 6 shows an example cost distribution adjustment method. It is contemplated that steps in example methods can occur in a different order from the examples shown and described herein. The example method is applied to drugs, although one of ordinary skill in the art will appreciate that this example method can be extended to other health care items (including services). Available drugs and available options and coupons for the drugs are retrieved, such as but not limited to the product options provided in a plan design formulary and included as an option in the database (step 94). For each particular product option (step 96), the cost distribution is received for the particular drug (e.g., from the plan design) (step 98) the co-payment (or co-insurance, or deductible) is adjusted for the selected drug (step 100), and the cost distribution for the selected drug is adjusted based on the adjusted co-payment, co-insurance, or deductible (step 102). The example method then considers whether all available drugs have been considered (step 104), and if so, the example cost distribution adjustment process ends. For some of the available drugs, the co-payment or co-insurance (or deductible) may not be adjusted, but the cost distribution for these drugs will be considered for comparison to other drugs for which a cost distribution has been adjusted.

For example, Table 2 below depicts an example coupon amount for the drug referred to in Table 1. Table 2 further shows an effect on the total cost charged and the cost distribution, including percentages of the new total cost paid by the participant and plan. Table 2 also shows a comparison with another product option (second line), which in this example is a generic drug of comparable therapeutic efficacy, and associated total and distributive costs.

| Total Cost of Drug | Tier Co-Payment | Co-Pay Coupon | Actual Member Cost/Percent of Total Cost | Plan Cost/Percent of Total Cost |
|---|---|---|---|---|
| $200.00/ ($150 if Coupon used) | $50.00 | $50.00 | $0; 0% total cost | $150/100% of actual cost paid |
| $30.00 | $3 | $0 | $3; 10% of total Cost | $27/90% of total cost paid |

As can be seen by Table 2, the use of a co-payment coupon decreases the total cost of the brand name drug to $150.00. If the coupon is applied to the participant's co-payment, as conventionally would occur, the amount paid by the participant in this example would be reduced to $0 (or zero percent of the total cost). Because the coupon is not applied against the plan's portion of the cost, the plan's portion of the cost remains $150. In this example the health plan would cover 75% of the total cost if the coupon were not applied, but 100% of the actual cost paid when the coupon is applied, because the entire value of the coupon in this example benefits only the participant.

By contrast, the generic alternative drug in line 2 has a total cost of $30 and according to an example health plan formulary has a tier co-payment of $3. However, in this example, no coupon is available. The participant then would be required to pay $3, or 10% of the total cost, with the plan being responsible for $27 or 90% of the total cost being paid. However, this $27 is significantly less than the $150 for which the plan would be responsible for if the brand name pharmaceutical is purchased.

This and similar conventional scenarios incentivize a participant to pursue the more expensive and no more effective brand name drug, as he/she actually pays nothing when compared with the equally effective generic drug for which he pays something out of pocket. Further, utilizing a conventional fixed dollar or fixed percentage co-pay system enables the manufacturer to artificially manipulate the actual costs paid for the drug. For example, as illustrated in Table 2, if the contracted cost through the pharmacy of the brand name drug was to be $200, the actual drug cost after the coupon is applied would be significantly less, but the cost is differentially shifted to the plan. This negates the intended effect of the formulary tier placement and increases overall costs by steering participants away from cheaper yet clinically effective medications.

In an example method according to the invention, the computer adjusts (step 100) the co-payment amount based on the received coupon amount. In this way, rather than utilizing, for instance, a tiered fixed dollar co-payment (e.g., $5, $15, $25 . . . ) or a tiered fixed percentage co-payment (e.g., 5% of total cost of Rx, 10% of total cost of Rx . . . ) as in conventional methods, the co-payment amount is dynamically adjusted in response to the coupon amount. This allows adjustment of the cost distribution, for instance, prior to final adjudication at the provider and before collection of the required co-payment or co-insurance from the participant.

Under different embodiments of the invention the amount of adjustment is determined through different steps. It can be, but need not be, the full coupon amount. The amount can be greater than or lesser than the coupon amount. The adjustment amount can be a particular percentage of the coupon amount, a scaled amount, an amount based on a formula incorporating the coupon amount, a lookup table amount given the coupon amount, a set amount depending on whether a coupon is available, or any amount that is based in some way on the coupon and alters the fixed dollar or percentage amount. In some embodiments, steps are performed of determining the adjustment amount through consideration of a desired alternative health care item. As an example, if it is desired to encourage purchase of a generic alternative drug over a brand name drug, some embodiment steps include dynamically determining the cost adjustment in an amount that makes purchase of the generic alternative lower than the branded amount.

Other factors can be used to adjust the co-payment amount, co-insurance amount, or deductible amount. Non-limiting examples include the value of existing manufacturer promotional coupons, patient assistance programs for individual health care items and/or manufacturers, and/or other health plan clinical programs and initiatives. These additional factors can be added or subtracted from or otherwise alter an adjustment amount. Multiple factors can be weighted in any suitable manner. Formulas or lookup tables incorporating multiple factors including the coupon amount can be employed to determine an adjustment amount. Calculation of an adjustment amount can be performed by the computer or elsewhere. Models can be configured, modified, etc, to comply with or maintain compliance with national and local government mandates (i.e., HIPAA, GINA, PPACA, etc).

As a non-limiting example, as shown in Table 3, the amount of the co-payment is adjusted by the full amount of the coupon for the brand name pharmaceutical item. However, it is to be understood that the amount of adjustment can be higher or lower than this coupon amount.

| Total Cost of Drug | Fixed Tier Co-Payment | Co-Pay Coupon | Actual Member Cost/Percent of Total Cost | Plan Fixed Co-Pay Cost/Percent of Total Cost | Dynamic Co-Payment = Tier co-payment + Co-pay Coupon | Dynamic Actual Member Cost = Dynamic Co-pay − Coupon | Dynamic Co-pay Plan Cost & Percent of Total cost |
|---|---|---|---|---|---|---|---|
| $200.00 ($150 with coupon) | $50.00 | $50.00 | $0: 0% total cost | $150/100% of actual cost paid | $50 + $50 = $100 | $100 − $50 = $50 | $100: 66% of total cost |
| $30.00 | $3 | $0 | $3: 10% of total Cost | $27/90% of total cost paid | | | |

As shown in Table 3, for a $50 co-payment coupon, the co-payment for the tier for which the brand name pharmaceutical resides is increased by the coupon amount. Thus, for a $50 coupon, the fixed amount of the co-payment as incorporated into the plan design ($50) is increased by the $50 coupon amount to equal $100 total. Thus, the participant now has a $100 adjusted co-payment for the brand pharmaceutical.

Based on this adjusted co-payment amount, the cost distribution for the brand pharmaceutical is then adjusted (step 102). In this example, the participant cost would be equal to the adjusted co-payment amount ($100) minus the coupon amount ($50) equaling $50, or one-third, of the now $150 total cost for the brand pharmaceutical. The plan cost then would be the remainder of the total cost, or $100 (66% of the total cost). Additional adjustments to the cost distribution can also occur, so long as the cost distribution is based at least in part on the adjusted co-payment, co-insurance, and/or deductible.

In this example, by utilizing a dynamic cost adjusting method, the fixed dollar amount of the co-payment as incorporated into the plan design ($50) is preserved, and the participant is required to pay at point of purchase the intended $50 co-payment. Further, whereas under a conventional fixed copayment system, the health plan would be responsible for $100 of the total cost of the brand pharmaceutical (total cost without coupon minus the coupon amount), and the participant $0, the health plan in this example only pays for its apportioned amount of the actual total cost of the drug, and the true price of the health care item that is being charged by the manufacturer through the pharmacy of $150 is the basis for the appropriate cost split. Additionally, as shown in Table 3, this adjustment can preserve the relevant cost differential between the branded pharmaceutical and the generic alternative (the generic alternative shown on the last line of Table 3). A similar method can be applied using the adjusted co-payment amount and associated systems with regard to fixed percentage co-payment, co-insurance, or deductible plan designs, as will be appreciated by those of ordinary skill in the art.

Referring again to FIG. 5, in an example embodiment, the adjusted cost distribution, including the total cost ($150), the adjusted copayment ($100) and the health plan cost ($100), can be delivered (step 106) to the participant along with a cost distribution of the generic alternative without a coupon (total cost $30; co-payment $3; plan cost $27) and forwarded to the participant, for instance at a point of purchase or directly to the participant via the network 36. This provides appropriate participant education, and empowers the participant to select the most appropriate therapy based upon cost and effectiveness. This facilitates best clinical practices and excludes outside manipulation of the health plan's copayment system, thus reducing overall costs.

According to another embodiment of the invention, the cost distribution for health care items is adjusted alternatively or additionally based on subject compliance data. This allows, in an example embodiment, adjustment of fixed percentage or dollar co-payments, co-insurance, or deductibles, preferably in real time, and allows for integration of subject compliance data such as integration of clinical and/or claims based inputs. This adjustment can be based on one or more formulas or steps that are configured to maximize other clinically effective choices, support health care clinical programs such as, but not limited to, disease management and life style management programs, by incentivizing targeted participants with cost distributions that can vary depending on compliance of one or more health instructions. For example, participation in a health plan clinical program, such as, but not limited to, disease and life style management programs, or other incentives such as, but not limited to, taking instructed medications at proper intervals, maintaining instructed dietary practices, exercise practices, weight limits, etc. can be used for incentives. Other non-limiting example incentives include filling a prior prescription for maintenance medication (e.g., blood pressure medication) on time for a certain period, thereby reinforcing the importance of filling and (presumably) taking medication on time, or conversely negatively adjusting a cost distribution for a participant if he has not filled on time.

Thus, in FIG. 5, if subject compliance data is to be considered (step 88), the subject compliance data is received, for example, by the eligibility file sources, the plan design, and/or a data source for medical records, and prior claims, PHA, etc. (step 90). Then, as shown in FIG. 6, for each available drugs (or any selected subset), the co-payment amount, the co-insurance amount, and/or the deductible amount are adjusted based on the compliance data (step 100), and the cost distribution is adjusted (step 102). An example cost adjustment is shown in Table 4 using a health incentive relating to taking medication or for glucose control.

| Total Cost of Drug | Tier Co-Payment | Med Compliance or Glucose Control Incentive Applied | Actual Member Cost | Plan Cost |
|---|---|---|---|---|
| $200.00 | $50.00 | $0 | $50 | $150 |
| $200.00 | $50.00 | $25 | $25 | $175 |

Line 1 of Table 4 shows an application of a base copayment for a brand pharmaceutical having a $200 total cost, and a tier copayment according to a health plan of $50. In line 1, no incentives are applied. Line 2 shows an example of an adjusted copayment amount assessed after a preferably real time application of an example algorithm for a plan specified incentive.

The example adjustment steps used can vary significantly depending on the intended incentive. In a particular non-limiting example embodiment, a participant can be rewarded for achieving control of blood sugars, under which an example cost adjustment method applies a health plan specified reduction to a copayment required for maintenance of diabetes management drugs and supplies when a participant has reduced his or her blood sugar readings or participated in a diabetes management program. Such health compliance data can be inputted from, as a non-limiting example, the electronic medical record using the network interface of the computer.

The computer 22 applies a model to adjust the co-payment (step 100). For example, as shown in Line 2, the tier co-payment $50 is adjusted downward to $25 based on a determination that the participant has complied with health care instructions, such as participation in the diabetes management program or reduced blood sugars. This example model deducts or does not deduct a fixed amount based on compliance or non-compliance. However, in other embodiments, an analytical model can adjust a co-payment, co-insurance, or deductible by a variable amount, a scaled amount, a series of amounts based on meeting particular health milestones, a weighted amount based on a combination of incentives, etc. For instance, an incentive amount can vary depending on a subject's cholesterol, BMI, blood sugar, and many other factors, or weighted combinations of such factors. The particular analytic model can include steps of using a look up table, a formula, etc., and can be performed by the computer or elsewhere.

The cost distribution is then adjusted (step 102). Referring again to Table 4, based on the adjusted co-payment of $25, the actual participant cost portion of the $200 diabetes medication is now $25, and the health plan cost portion is $175. The co-payments, co-insurance, or deductible can be varied according to plan design and incentives based on subject compliance information such as claims and biometric data abstracted from the medical record and/or personal health assessment data.

The coupon amount and the subject compliance data can both be considered to adjust a co-payment, co-insurance, or deductible amount, and thus a cost distribution. For example, the coupon amount can be applied, and then the incentive based on the subject compliance data, or vice versa. The adjustments can be combined and weighted in any suitable manner.

Though the specific representative example in Tables 1-4 is applied to pharmaceutical items, it is to be understood that other types of health care items can have a cost distribution that is adjusted under example methods. For example, co-payments for health services can be provided. In an example, the computer adjusts (preferably dynamically) the co-payment amount required at time of service in a health care provider location such as a physician's office or laboratory facility, depending on predetermined criteria such as set out in a health plan.

The delivered adjusted cost distribution (step 106) can include, for instance, information indicating the total cost, the adjusted co-payment (or co-insurance or deductible), the plan cost, the total cost and cost distribution for other product options, etc. In particular example embodiments, though not required in all embodiments, this adjusted cost distribution is delivered as part of an explanation of benefits (EOB) (step 108) generated by the computer 22, which is preferably clear, concise, and fully health plan compliant. The cost distribution, e.g., the EOB, can be delivered to a point of purchase such as the health care provider (e.g., pharmacy) for distribution to the participant. If additional data is available (e.g., from the participant, health care provider or other source) (step 110), this data can be used to again readjust the cost distribution. Other sources of information, such as but not limited to web sites and other relevant clinical programs, can be promoted or referenced as well.

Alternatively or additionally, the cost distribution, e.g., the EOB, can be sent directly to the participant explaining the cost distribution, and possibly additionally advising the participant where to obtain further information about optimizing their therapeutic choices under the health plan and minimizing costs. Such further information can be delivered to the participant in the example embodiment via a supported participant web portal.

An example EOB includes a total cost and an adjusted cost distribution for the particular product option, and at least a portion of received subject compliance information. This Explanation of Benefits can be delivered, e.g., sent, to a recipient such as a participant. In a non-limiting example, the EOB is delivered to a point of purchase, and further includes required claims adjudication information, as well as advice regarding the ability to lower costs if medication is filled in a timely way, and further provides clinical information to support the importance of taking medications as prescribed.

FIG. 7 shows an example EOB 116 provided at a point of service for a pharmacist, who collects a dynamic, real-time adjusted co-payment based on a received coupon amount. This allows collection of an adjusted co-payment, and further reinforces benefits of the adjustment. The EOB 116 can be printed as a hard copy, displayed on a suitable display (e.g., monitor at point of service), downloaded from a server (e.g., the computer) collating data inputs, or can be electronically distributed via the web, mobile app, etc.

The example EOB 116 includes medication information 118, for instance for a cholesterol-lowering drug having a total cost of $200, which is covered by the plan. A coupon amount of $100 is indicated. A cost distribution 120, including a fixed co-payment of $30, is shown, and an adjusted co-payment 122 is shown, which is provided by adding the coupon amount (in this example, the full amount) to the fixed co-payment. An explanation 124 of the dynamic co-payment is provided. The new actual total cost of the drug 126 (original total cost minus coupon) of $100 is shown as covered under the plan. The adjusted cost distribution, including the dynamic co-payment of $30 and the plan amount of $70 is presented to the participant 127. The EOB further includes an explanation 128 of an incentive that is available to the participant, in which lower cholesterol can reduce the co-payment amount (this reduced co-payment amount is dynamic, and is not part of a standard tier of the plan), including a hypothetical co-payment of $10 and plan amount of $90 that would be available if a health incentive (in this example, lowered cholesterol value) was met. Finally, the example EOB indicates 130 where the participant can obtain additional information about the EOB, or for additional health information, such as information related to incentive programs.

The adjusted cost distribution in this example EOB reflects a total cost of the prescription reduced utilizing the coupon amount ($100). The dynamic co-payment reduces total prescription cost while reinforcing optimal behaviors toward achieving a target cholesterol goal. The pharmacy receives the $30 co-payment, the $70 plan payment, and the $100 coupon for a total received of $200 (the price of the drug).

FIG. 8 shows another example EOB 132 for the same cholesterol-lowering drug, which can also be provided at point of service by a pharmacist. The EOB indicates the original total cost 120 and cost distribution 122, and the dynamic co-payment 126. Further, in this EOB, the co-payment is further dynamically adjusted 132 by $20 for complying with health instructions 134. Particularly, the participant's EMR indicates that his/her cholesterol is less than or equal to 200, which triggers a $20 co-payment discount. The discount dynamically adjusts the co-payment, resulting in a new dynamic co-payment 136 of $10. This new dynamic co-pay 136 is accompanied by an explanation of the reason for the further adjustment, which provides additional health education and incentive for the participant. The final adjusted cost distribution 138 is presented to the participant, including a $100 total cost, a dynamic co-payment of $10, and a plan amount of $90. Combined with the $100 coupon amount, the pharmacy receives $200.

FIG. 9 shows another example EOB 140 reflecting a dynamic co-payment for a physical visit, based on multiple health incentives. This example EOB 140 can be provided at a point of service by a physician who collects real-time adjusted co-payment. This avoids balance billing and allows collection at time of service, and further reinforces benefits of an example dynamic co-payment adjustment. The example EOB 140 can be a printed hard copy downloaded from a server (e.g., the computer) collating data inputs, a displayed copy at the point of service, or electronically distributed online (e.g., via web, mobile app, etc.)

The example EOB for a medical wellness office visit indicates at 142 a total cost of $175. $150 is covered by the plan, and $25 is required by the participant as a co-payment. However, under the example plan (a PPO), the physician has a contract with the plan under which the amount that can be charged for an office visit is $150. This results in a contract reduction (a discount) of $25 for the office visit. The EOB can include an explanation at 144 of this required discount and that the maximal amount of the charge is limited to the network contracted amount of $150.

The EOB further indicates that the participant's co-payment is $50, which is dynamically adjusted based upon the application of a variety of health incentives that the participant is eligible for based upon the plan design and additional data pulled from the medical record, eligibility files, and claims data. In the example the co-payment is dynamically adjusted 147 by multiple incentives provided by received subject compliance information. In the example EOB, the co-payment is dynamically adjusted for seat belt compliance ($10), participation in diabetes education ($10), having a controlled blood sugar ($10), on time fill of diabetes medications ($10), and for receiving an influenza vaccine ($10). The total incentive adjustment is $50, which results in a dynamic co-payment of $0. This dynamic co-payment 148 is presented in the EOB, along with an explanation 149 reinforcing optimal behaviors.

The total cost paid to the physician is $150, the amount agreed to under the PPO contract. The participant's portion in this example is zero due to the dynamic co-payment. The plan is responsible for $150, but successfully provides several incentives for the participant, and by facilitating optimal behavior and outcomes ultimately saving future plan costs through reduction in future service needs in a healthier plan population.

The adjusted cost distribution and/or Explanation of Benefits can also be delivered to a recipient such as the participant via a web portal (including PC or mobile app). This provides incentives to a participant to comply with health instructions even if a particular health care item is not being purchased at that particular time. Further, the recipient in an example embodiment can submit additional information to update the health compliance or other data, and this can be used to readjust the cost distribution. This allows the participant or health care provider to either actually adjust the cost distribution for a purchased item, or perhaps to hypothetically determine the affect of compliance with health care instructions on a cost distribution.

Referring again to FIG. 3, illustrating a particular application of this method as applied to a drug, the computer 22 can, for instance, apply a dynamic co-payment analytic model to adjust the co-payment 150. The resulting dynamic co-payment can be used to adjust the cost distribution. The adjusted cost distribution is delivered to the participant, who may elect an alternate, less costly drug when given a sample EOB at the point of purchase or after utilizing a simulator at an example web portal 154. The participant can elect to co-pay for either drug after qualifying for additional incentives applied using a dynamic co-payment 156. As a result of this particular example application, improved or optimal outcomes can be achieved by utilizing the dynamic cost adjustment, including but not limited to reduced payor costs, and channeling to optimal treatments and increasing or maximizing clinical management programs 158.

Another example embodiment provides a method for adjusting a cost distribution of a premium by adjusting a co-premium. A dynamic and customizable system is provided that varies co-premiums, preferably in real time. Dynamic adjustment can take place at a point of payment or billing of periodic, e.g., monthly, weekly, semiannual, annual, etc., collection of participant's portion of premium for health care coverage. Such an example system can support benefit plan designs, as well as evidence based, outcome driven, highest quality and most cost efficient medications, treatments, clinical programs, etc.

For instance, a non-limiting example premium cost distribution is provided with respect to the data shown in Table 5 below.

| Total Cost Of Premium Per Month | Co-Insurance or Participant portion of Premium | Participant Cost & Percentage of Premium Paid | Employer Cost of Coverage/Premium & % Paid |
| --- | --- | --- | --- |
| $500.00 | $100.00 | $100.00/20% | $400.00/80% |

Table 5 shows a total cost of a monthly premium of $500 for a plan, such as but not limited to a governmental plan, an employer sponsored plan, or part of an enrollment process. The $500 total monthly premium is distributed among a co-premium or participant portion of the premium of $100, and a payor (e.g., an employer) cost of $400. Thus, in this example the participant pays 20% of the monthly premium, and the payor pays 80%.

This premium cost conventionally is determined in a variety of ways depending upon the type of plan. In the case of an employer sponsored plan, for instance, the cost of coverage is usually actuarially determined for the entire insured population, and based upon CBAs or other requirements predicate to enrolling in a given plan, the cost of premiums are distributed between the participant and the employer. In the case of private insurance not obtained through an employer or governmental program, cost of coverage is dependent upon underwriting processes that look at risk in the form of demographic factors and, where permissible, incorporate "risk" algorithms prior to enrollment. Conventionally, premiums are set or guaranteed for a specific period of time such as a plan year, and premiums are collected on a set schedule.

In an inventive embodiment, rather than utilizing a fixed dollar participant portion (co-premium) or a fixed percentage, actual dollar amounts of the participant's portion can be dynamically adjusted, preferably in real time, in response to a request, and prior to payment of the premium. An example cost adjustment integrates clinical and/or claims based inputs that support example models configured to support plan clinical programs such as, but not limited to, disease and lifestyle management programs, by incentivizing targeted participants. Adjustments to the co-premiums can be, for example, pegged to participation in designated plan clinical programs, such as, but not limited to, disease or lifestyle management programs, based upon compliance with taking medication, or a variety of other clinical programs and inputs. These co-premiums can be varied according to the plan design and incentives that are accessed by the computer, including compliance information such as, but not limited to, claims and biometric data abstracted from a medical record or PHA data, as well as based upon reduction of modifiable risk factors such as, but not limited to, seatbelt utilization (where permitted by law).

As a non-limiting example, co-premiums can be reduced if the member has filled all of his prior prescriptions for his maintenance medication (e.g., blood pressure medication) on time during a prior benefit period. The immediate reduction in subsequent co-premiums or the resulting deduction in subsequent co-premiums helps to reinforce the importance of filling and hopefully taking medications on time. Conversely, the co-premium could be raised if the participant has not filled medications on time. Some embodiments include steps of communicating a corresponding message to the participant reinforcing this intended behavior modification, with an example being: "your co-premium has been adjusted to $40 based on your late filling of this prescription. Had you filled it on-time 8 days ago your co-premium would have been $18."

The application of adjusted (e.g., differential) co-premiums not only reinforces appropriate participant behavior but also can appropriately apportion incremental risk associated with core compliance with prescribed treatment regimens. Other example health instructions may include rewarding the participant for participation in disease management programs or achieving improvement in blood glucose control. Utilizing an example cost adjustment method based on a participant's blood sugar, cost adjustments to the co-premiums can be applied on a go forward basis so long as the participant continued to remain engaged in programs or maintained appropriate Hgb A1c values based upon health compliance information such as data inputted from an EMR. Any of the subject compliance data examples, sources, etc. used in example methods shown and described herein are likewise applicable to other methods herein, or additional methods as will be apparent to those of ordinary skill in the art.

This dynamic adjustment can occur, for example, at billing, payroll or payroll deduction in accordance with the plan. This can facilitate application of regulatory compliant (HIPPA, PPACA, etc.) incentives (and disincentives) that support care and lifestyle management initiatives and, where permissible, assessment and modification of modifiable risk factor (e.g., smoking cessation, seatbelt usage, completion of a personal health assessment, etc.).

An example embodiment can optimize cost sharing with regard to a portion of premiums to be due and collected from participants. This can allow the portions of premiums due and collected from participants to support health plan designs that facilitate programs that optimize healthy participant behavior and optimal management of disease states, as well as integrating and modifying costs of coverage, preferably in real time, based upon risk and a participant's willingness to change modifiable risk factors. This can facilitate savings for health plan payors as well as participants, as well as managing total payor (e.g., employer, plan sponsor, etc) costs through optimal outcome and cost sharing strategies.

Figure 10:
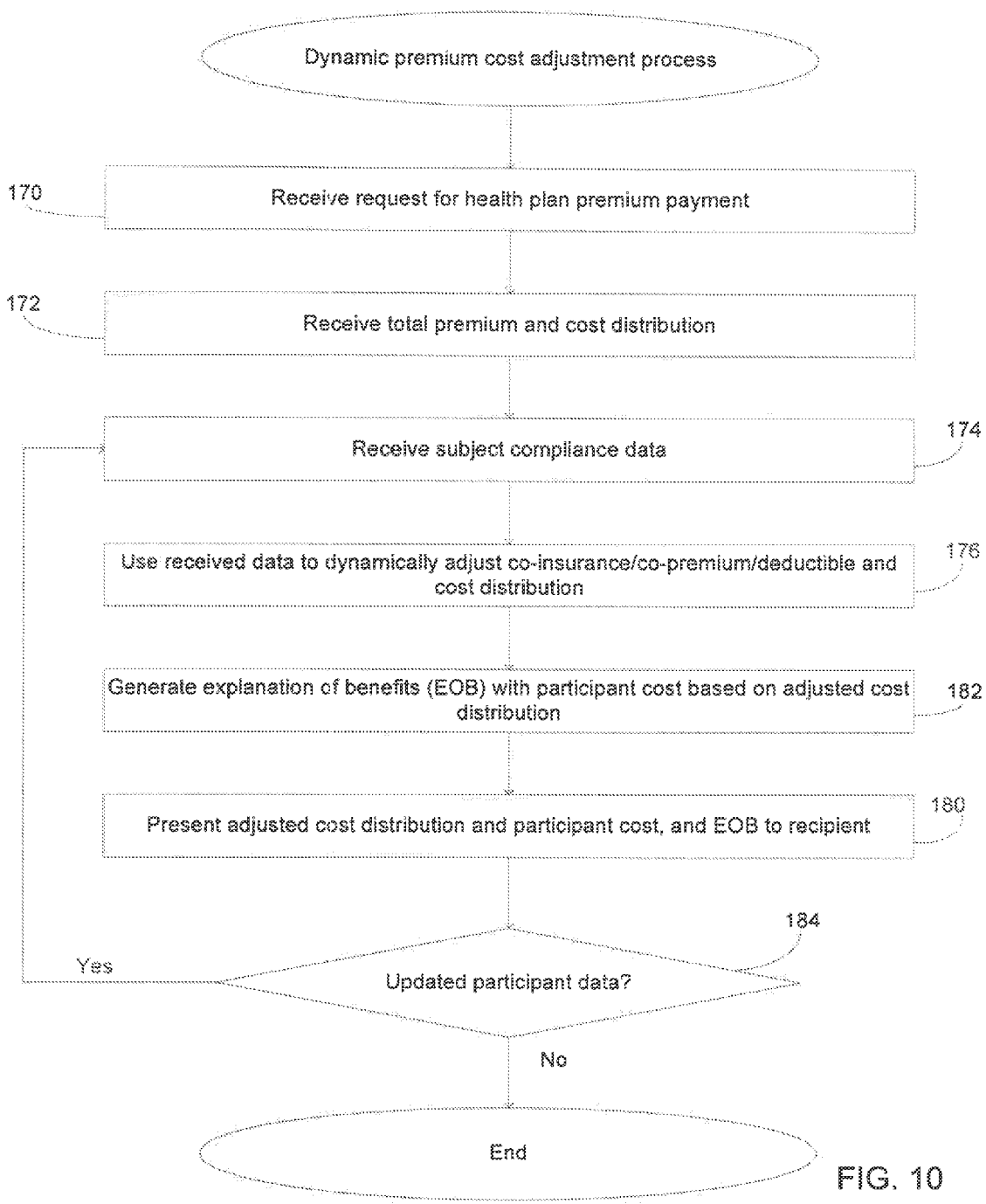
FIG. 10 shows an example embodiment dynamic premium cost adjustment process.

FIG. 10 shows an example method for adjusting a cost distribution of a premium. A similar computer 22 and network 36, 38 as shown in FIGS. 1-3 can additionally or alternatively be configured to perform this example method. A computer receives a request for a premium payment amount (step 170). This request can originate at, for example, a participant, a health care provider, and/or a health payor, particularly in cases where a co-insurance or a deductible is adjusted. The request could additionally come from a participant or a plan administrator if the co-premium is to be adjusted.

The computer 22 receives a total premium cost, such as by retrieving the eligibility data and/or the plan design (step 172). Cost distribution data is also received for the premium, such as from the eligibility data or plan design sources. This cost distribution includes a co-premium amount. Subject compliance data such as, but not limited to, that described elsewhere herein, is received by the computer (step 174). As described above, the subject compliance data can originate from eligibility files and/or subject compliance information sources.

Next, the co-premium amount is adjusted based at least on the subject compliance data, and the cost distribution is adjusted (step 176). Preferably, these adjustments are dynamic. As a non-limiting example, the co-premium amount can be decreased if the subject compliance information indicates compliance with a health incentive, such as complying with particular health instructions. The computer 22 can also increase the co-premium amount if the subject compliance information indicates a lack of compliance with health incentives.

Again, this compliance or non-compliance can be relative. Further, the amount of decreasing or increasing can be a fixed amount depending on compliance or non-compliance, can be scaled (e.g., a sliding scale based on cholesterol level, blood sugar, BMI, etc.), and/or can be based on a particular formula, model, lookup table, etc. Consecutive periods of compliance, or compliance for multiple factors, could provide progressively increasing adjustment amounts. Multiple incentive factors can be used to adjust the co-premium amount, and these factors can be weighted as desired. In some example methods, the co-premium amount can be dynamically increased due to some factors and decreased due to others, resulting in a net increase or decrease. Calculation of adjustment amounts can be determined by the computer or elsewhere.

An example of this dynamic cost adjustment for the $500 monthly premium is shown in Table 6, below.

| Total Cost of Premium Per Month | Co-Insurance or Participant portion of Premium | Lifestyle/ Disease Management Incentive Applied | Participant Cost & Percentage of Premium Paid | Employer Cost of Coverage/ Premium & % Paid |
|---|---|---|---|---|
| $500.00 | $100.00 | $0 | $100/20% | $400/80% |
| $500.00 | $100.00 | $50 | $50/10% | $450/90% |

The first line of Table 6 shows an application of the base co-insurance or participant's portion of the premium with no incentives applied, discussed above with respect to Table 5. The second line of Table 6 shows an example of an adjusted cost distribution. The participant portion of the premium now includes a discount of $50 as a lifestyle/disease management incentive, such as any of those disclosed herein, or other incentives. This dynamically reduces the co-premium from $100 to $50. The cost distribution is then adjusted based on the adjusted co-premium. Particularly, as further shown in Table 6, the participant cost is now $50 or 10% of the total monthly premium cost, while the payor (e.g., employer) cost of the premium is increased to $450, or 90%.

As with other example methods disclosed herein, the computer can deliver the adjusted cost distribution for the premium to a recipient (step 180). In an example embodiment, the computer produces an EOB (step 182) that includes the total premium cost and the adjusted cost distribution, though an EOB is not required in all embodiments. The EOB preferably is a clear, concise, and fully plan compliant hardcopy or electronic explanation of the adjusted cost distribution, including the co-premium, the total cost (e.g., base premium), as well as the cost distribution between the participant and the payor. Further, an example EOB can include health information (including directly provided information and/or a referral to health information) such as reference resources for obtaining additional education and information with regard to the participant's underlying medical condition, as well as a basis of cost for their portion, including promoting applicable ancillary programs and web portals. The recipient can be, but is not limited to, the participant, the provider, a health plan administrator, or a health care payor. An example EOB is analogous to those shown in FIGS. 7-9.

Similar to other example methods disclosed herein, if the recipient is a participant, the participant may in some example embodiments have an opportunity to submit updated data (step 184), and the cost distribution can be re-adjusted and re-submitted to the participant. In an example embodiment, the recipient can submit updated data including, but not limited to, health compliance data, subject eligibility data, or other data to the computer, either as actual data, or as hypothetical data to determine a projected cost adjustment for a premium based on the updated data. A readjusted cost distribution can then be generated and delivered in a method similar to those stated elsewhere herein. This allows the participant to hypothetically determine an effect of one or more health incentives on his/her portion of a premium. This feedback can be provided, for instance, via a web portal.

Figure 11:
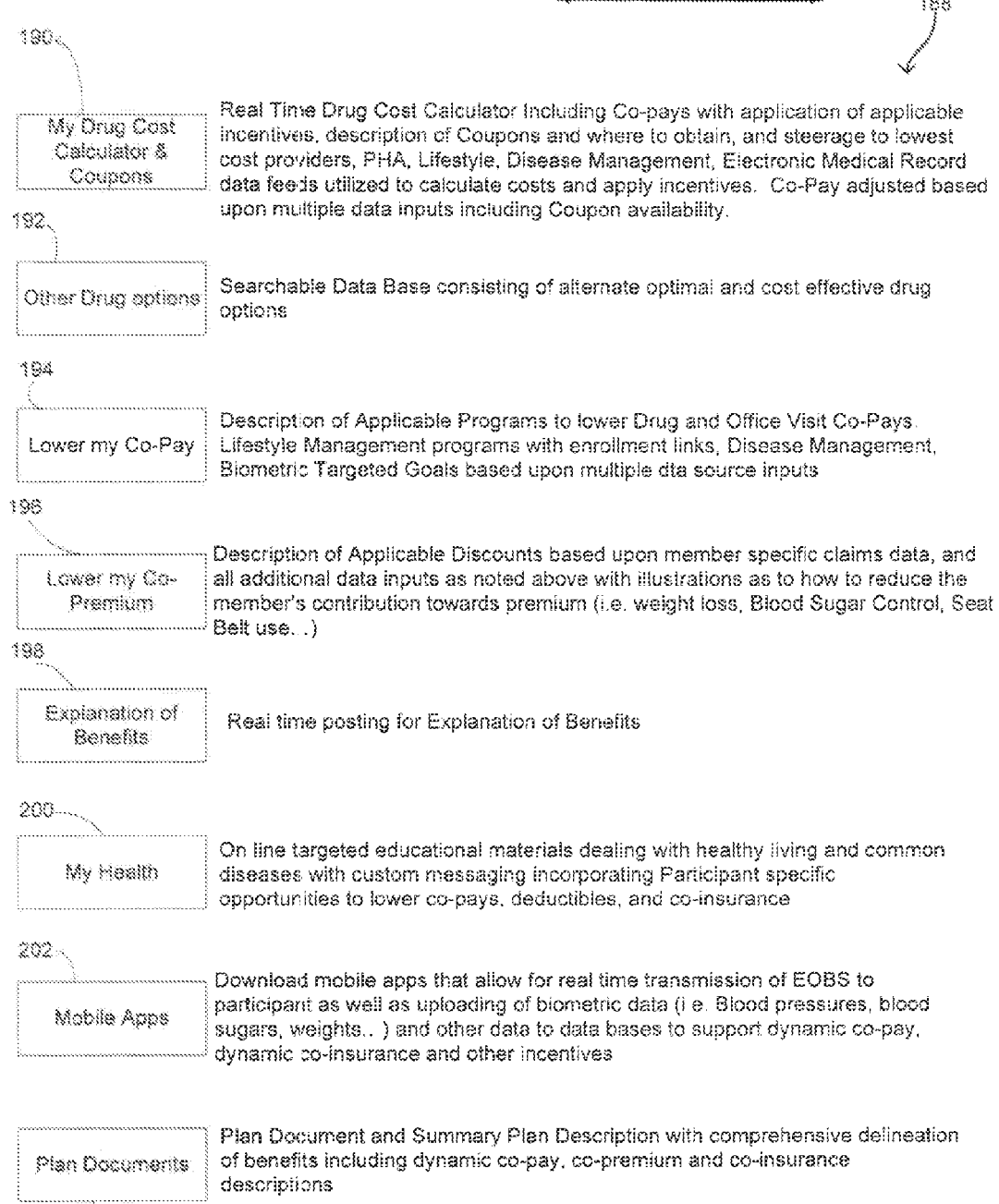
FIG. 11 shows a home page for an example web portal.

FIG. 11 shows an example home page 188 for a web portal, which can be accessible via online browser (e.g., web browser) and/or a standalone application, such as but not limited to a computer or mobile application, that communicates with the computer via the network. An example web portal is secure (requiring participant's specific sign in data) and can be updated with relevant information from the computer. Further, an example web portal allows participants to see not only their prior claim information, but to obtain targeted information with regard to health plan programs and participant guided clinical educational resources facilitating optimal clinical outcomes in reducing total costs.

The example home page 188 includes selectable icons for navigating to various pages or portions of a web site or application. For example, a cost calculator and coupon icon 190 links to a real time cost calculator for a health item (e.g., a drug), including a cost distribution with application of applicable incentives. The calculator can incorporate subject compliance data, such as PHAs, disease management, EMR data feeds, etc. to calculate costs and apply incentives (either actual or simulated). Coupons can be presented as well, including a description and location for accessing the coupon. This area can be used to help steer a user to a lowest cost provider. The dynamic co-payment adjustment can be based on multiple data inputs, including subject compliance information and coupon availability. A drug option icon 192 links a user to a searchable database, such as a portion of the database or a separate, networked database, including alternate optimal and cost effective drug options.

An icon 194 for lowering a co-pay links to a description of applicable programs to lower health item and office visit co-payments. This description can include, but is not limited to, lifestyle management programs with enrollment links, disease management, biometric targeted goals based on multiple data source inputs, etc. Similarly, an icon 196 for lowering a co-premium links to a description of applicable discounts based upon member specific claims data, as well as additional data inputs as set out elsewhere herein. Incentive information and health instructions can be provided, explaining how to reduce the participant's premium contribution via complying with health incentives such as, but not limited to, weight loss, blood sugar control, seat belt use, etc.

An "Explanation of Benefits" icon 198 links to a real time posting of explanation of benefits, such as archived EOBs. Another icon 200, such as "My Health," links the user to online targeted health education information, educational materials directed to healthy living and common diseases. Custom information, e.g. messaging, can be provided incorporating participant specific opportunities to lower co-payments, deductibles, and/or co-insurance.

The example web portal can also include a link 200 to download a mobile application or other connected or standalone application that allows for real time transmission of EOBs to participants, as well as uploading of biometric data or other data to support dynamic cost adjustments or other incentives. Biometric data can include, but is not limited to, blood pressure, blood sugar, weight, etc. Further, the web portal can include an icon 202 linking to a plan document and summary plan description. This can include comprehensive delineation of benefits, including dynamic co-payments, co-premiums, and/or co-insurance descriptions.

It will be appreciated that example web portals can vary, and that one or more of these icons/links can be varied or omitted. The web portal can be presented in any language, in substantially any suitable format for presentation, and can be provided in communications media other than the web. Further, the web portal can be written in any computer-readable language (including markup languages, scripts, plug-ins, computer languages such as Java, Objective C, C++, C#, or any other suitable language), and can be configured for browser-based or application-based interactivity from a user, as will be appreciated by those of ordinary skill in the art.

Applications include, but are not limited to, optimizing cost sharing with regard to the portion of premiums and co-insurance to be due and collected from participants and support plan designs that facilitate programs that optimize healthy participant behavior and optimal management of disease states as well as integrating and modifying costs of coverage in real time based upon risk and the participant's willingness to change modifiable risk factors, thereby facilitating savings for plan sponsors and participants as well as managing total employer/plan sponsor cost through optimal outcome and cost sharing strategies.

While various embodiments of the present invention have been shown and described, it should be understood that other modifications, substitutions, and alternatives are apparent to one of ordinary skill in the art. Such modifications, substitutions, and alternatives can be made without departing from the spirit and scope of the invention, which should be determined from the appended claims.

Various features of the invention are set forth in the appended claims.

What is claimed is:

1. A method for adjusting a cost for a health care item purchased under a health care plan, the method comprising:
   receiving a request for the health care item; and
   for at least one product option corresponding to the requested health care item:
      receiving a total cost for the product option;
      receiving a cost distribution for the total cost, wherein the cost distribution comprises a health care plan cost and a participant cost;
      receiving a coupon amount related to the product option;
      increasing the participant cost based on the coupon amount;
      subtracting the coupon amount from the increased participant cost to provide an adjusted participant cost;
      adjusting, using a processor, the cost distribution based on the adjusted participant cost; and
      delivering the adjusted cost distribution for the product option to a recipient.

2. The method of claim 1, wherein the adjusting the cost distribution is performed in real time.

3. The method of claim 1, wherein the health care item is a pharmaceutical product; and
   wherein each of the at least one product option is one or more of the requested health care item and therapeutically equivalent options.

4. The method of claim 1, wherein said delivering comprises:
preparing an explanation of benefits (EOB), including the total cost and the adjusted cost distribution for the product option; and
sending the EOB to the recipient.

5. The method of claim 1, further comprising:
for at least one additional product option corresponding to the requested health care item:
receiving a total cost and a cost distribution for the additional product option; and
delivering the cost distribution for the additional product option to the recipient.

6. The method of claim 5, wherein the delivering adjusted cost distribution for the product option comprises:
preparing an explanation of benefits (EOB) including the received total cost and the adjusted cost distribution for the product option; and
sending the EOB to the recipient;
wherein the delivering the adjusted cost distribution for the additional product option comprises:
adding the received total cost and the cost distribution for the additional product option to the prepared EOB before the sending.

7. The method of claim 1, wherein the receiving a cost distribution comprises receiving a health care plan design;
wherein the health plan design comprises the health plan cost and the participant cost.

8. The method of claim 7,
wherein the health care item comprises a pharmaceutical product;
wherein the health care plan further comprises a formulary;
wherein the method further comprises:
selecting each of the at least one product option based on the formulary.

9. The method of claim 1, wherein the request is received from a health care provider.

10. The method of claim 1, wherein the request is received from a health care plan participant;
wherein the request is sent from a point of purchase and/or a web portal.

11. The method of claim 1, wherein the recipient is one of a health care plan participant, a health care provider, and a health care payor.

12. The method of claim 1, further comprising:
receiving subject compliance data; and
further adjusting the cost distribution based on the received subject compliance data.

13. The method of claim 12, wherein the subject compliance data comprises claims information, a medical record, and/or a personal health assessment.

14. The method of claim 12, wherein the further adjusting a cost distribution comprises:
decreasing or increasing the participant cost based on whether the subject compliance information indicates compliance with a health incentive.

15. The method of claim 12, further comprising:
retrieving subject eligibility data; and
wherein the adjusting a cost distribution is further based on the retrieved subject eligibility data.

16. The method of claim 12, wherein said delivering comprises:
preparing an explanation of benefits (EOB), including the received total cost and the adjusted cost distribution for the product option, and a portion of retrieved subject compliance information; and
sending the EOB to the recipient.

17. The method of claim 12, wherein the request is received from a health care plan participant;
wherein the recipient is the health care plan participant;
wherein the request is sent from a web portal;
further comprising:
receiving additional subject compliance data from the health care plan participant;
re-adjusting the cost distribution based on the additional subject compliance data; and
delivering the re-adjusted cost distribution to the health care plan participant.

18. An apparatus for adjusting a cost for a health care item, the apparatus comprising a non-transitory computer-readable medium containing computer-readable instructions for causing a computer to perform a method comprising:
receiving a request for the health care item;
for at least one product option corresponding to the requested health care item:
receiving a total cost for the product option;
receiving a cost distribution for the total cost, wherein the cost distribution comprises a health care plan cost and a participant cost;
receiving a coupon amount related to the product option;
increasing the participant cost based on the coupon amount;
subtracting the coupon amount from the increased participant cost to provide an adjusted participant cost;
adjusting, by a processor, the cost distribution based on the adjusted participant cost; and
delivering the adjusted cost distribution for the product option to a recipient.

19. The apparatus of claim 18, wherein the adjusting the participant cost is dynamic, and wherein the recipient is at a point of purchase for the health care item.

20. An apparatus for providing a cost assessment of a health care product for a subject, the apparatus comprising:
an interface configured to receive a request for a health care product and communicate with a recipient over a network;
a processor configured to perform a method comprising, for at least one product option corresponding to the requested health care product:
receiving a total cost for the product option;
receiving an initial cost distribution for the product option, wherein the cost distribution comprises a health care plan cost and a participant cost;
receiving a coupon amount related to the product option;
increasing the participant cost based on the received total cost, initial cost distribution, and coupon amount;
subtracting the coupon amount from the increased participant cost to provide an adjusted participant cost;
adjusting a cost distribution for the product option based on the adjusted participant cost; and
delivering the adjusted cost distribution for the product option to the recipient over the network via the interface.

21. A method for adjusting a cost for a health care item purchased under a health care plan, the method comprising:
receiving a request for the health care item; and
for at least one product option corresponding to the requested health care item:
receiving a total cost for the product option;
receiving a cost distribution for the total cost, wherein the cost distribution comprises a health care plan cost and a participant cost;

receiving a coupon amount related to the product option;
increasing the participant cost based on the coupon amount;
lowering the health care plan cost based on the coupon amount;
adjusting, using a processor, the cost distribution based on the increased participant cost and the lowered health care plan cost; and
delivering the adjusted cost distribution for the product option to a recipient.

* * * * *